(12) United States Patent
Kamibayashi et al.

(10) Patent No.: US 7,181,008 B1
(45) Date of Patent: Feb. 20, 2007

(54) CONTENTS MANAGEMENT METHOD, CONTENT MANAGEMENT APPARATUS, AND RECORDING MEDIUM

(75) Inventors: Toru Kamibayashi, Chigasaki (JP); Taku Kato, Kamakura (JP); Hideyuki Toma, Kodaira (JP); Makoto Tatebayashi, Takarazuka (JP); Shunji Harada, Osaka (JP); Hisashi Yamada, Yokohama (JP)

(73) Assignees: Kabushiki Kaisha Toshiba, Kawasaki (JP); Matsushita Electric Industrial Co., Ltd., Osaka (JP)

( * ) Notice: Subject to any disclaimer, the term of this patent is extended or adjusted under 35 U.S.C. 154(b) by 885 days.

(21) Appl. No.: 09/611,716

(22) Filed: Jul. 6, 2000

(30) Foreign Application Priority Data

Jul. 9, 1999 (JP) ................................ 11-196207

(51) Int. Cl.
*H04K 1/00* (2006.01)
*H04L 9/00* (2006.01)

(52) U.S. Cl. .................. 380/22; 380/200; 380/201; 380/203

(58) Field of Classification Search .............. 386/95; 713/193, 201; 380/201, 5, 203, 278; 705/26, 705/57; 308/23
See application file for complete search history.

(56) References Cited

U.S. PATENT DOCUMENTS

| | | | |
|---|---|---|---|
| 5,319,705 A | 6/1994 | Halter et al. | |
| 5,963,909 A * | 10/1999 | Warren et al. | 705/1 |
| 6,266,416 B1 * | 7/2001 | Sigbj.o slashed.rnsen et al. | 380/255 |
| 6,347,846 B1 * | 2/2002 | Nakamura | 380/203 |
| 6,463,151 B1 * | 10/2002 | Iitsuka et al. | 380/201 |
| 6,470,085 B1 * | 10/2002 | Uranaka et al. | 380/231 |
| 6,577,734 B1 * | 6/2003 | Etzel et al. | 380/277 |
| 6,587,837 B1 * | 7/2003 | Spagna et al. | 705/26 |

(Continued)

FOREIGN PATENT DOCUMENTS

JP 10-079174 3/1998

(Continued)

OTHER PUBLICATIONS

"SDMI Portable Device Specification, Part 1, Version 1.0," SDMI Secure Digital Music Initiative, Document Number pdwg99070802, Los Angeles, CA, pp. 6-20 (Jul. 8, 1999), XP-000997330.

(Continued)

*Primary Examiner*—Nasser Moazzami
*Assistant Examiner*—Carl Colin
(74) *Attorney, Agent, or Firm*—Finnegan, Henderson, Farabow, Garrett & Dunner, L.L.P.

(57) ABSTRACT

An apparatus generates first shared information that is shared by the apparatus and a recording medium by performing a first bilateral authentication. The apparatus encrypts overwrite data that is used to erase key information item recorded in the recording medium using the first shared information. Encrypted overwrite data is transferred to the recording medium. Second shared information is generated and shared by the apparatus and the recording medium by performing a second bilateral authentication between them. The apparatus receives data that is encrypted using the second shared information and that has been used by the recording medium for erasing key information. Encrypted data is decrypted using second shared information item and key information recorded in the recording medium is erased when the decrypted data is identical to overwrite data.

3 Claims, 19 Drawing Sheets

U.S. PATENT DOCUMENTS

| | | | |
|---|---|---|---|
| 6,842,521 B2* | 1/2005 | Nakamura | 380/203 |
| 2001/0023417 A1* | 9/2001 | Stefik et al. | 705/57 |
| 2002/0003879 A1* | 1/2002 | Ibaraki et al. | 380/201 |

FOREIGN PATENT DOCUMENTS

| | | |
|---|---|---|
| KR | 1998-025007 | 7/1998 |

OTHER PUBLICATIONS

L. Comerford et al., "Method for Transferring Copy Protected Software Without Destroying Copy-Protection," IBM Technical Disclosure Bulletin, vol. 27, No. 5, p. 3013 (Oct., 1984), XP-001068909.

European Search Report issued by the European Patent Office, mailed May 3, 2006, in European Appl. No. 00114421.1.

* cited by examiner

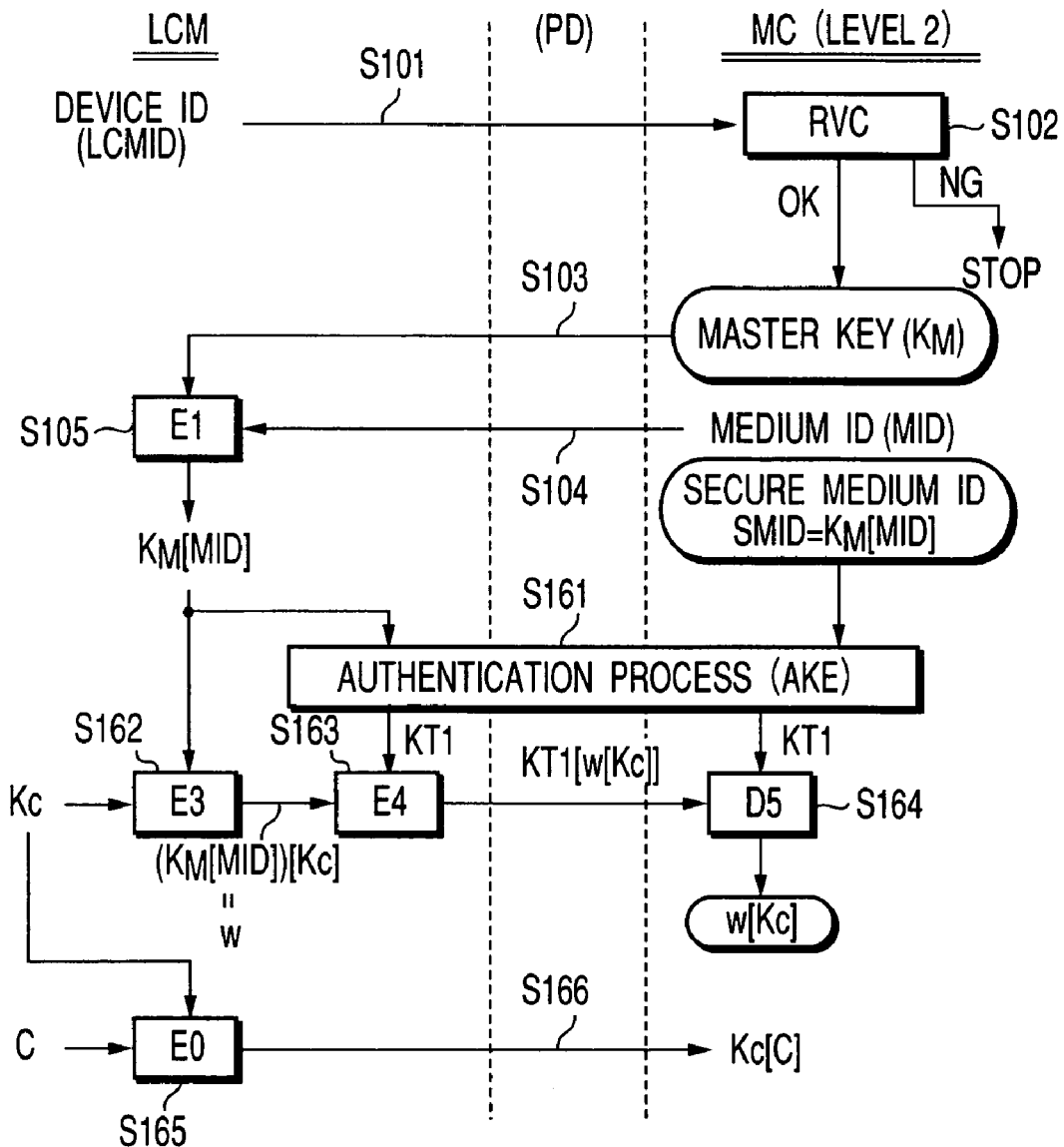
F I G. 14

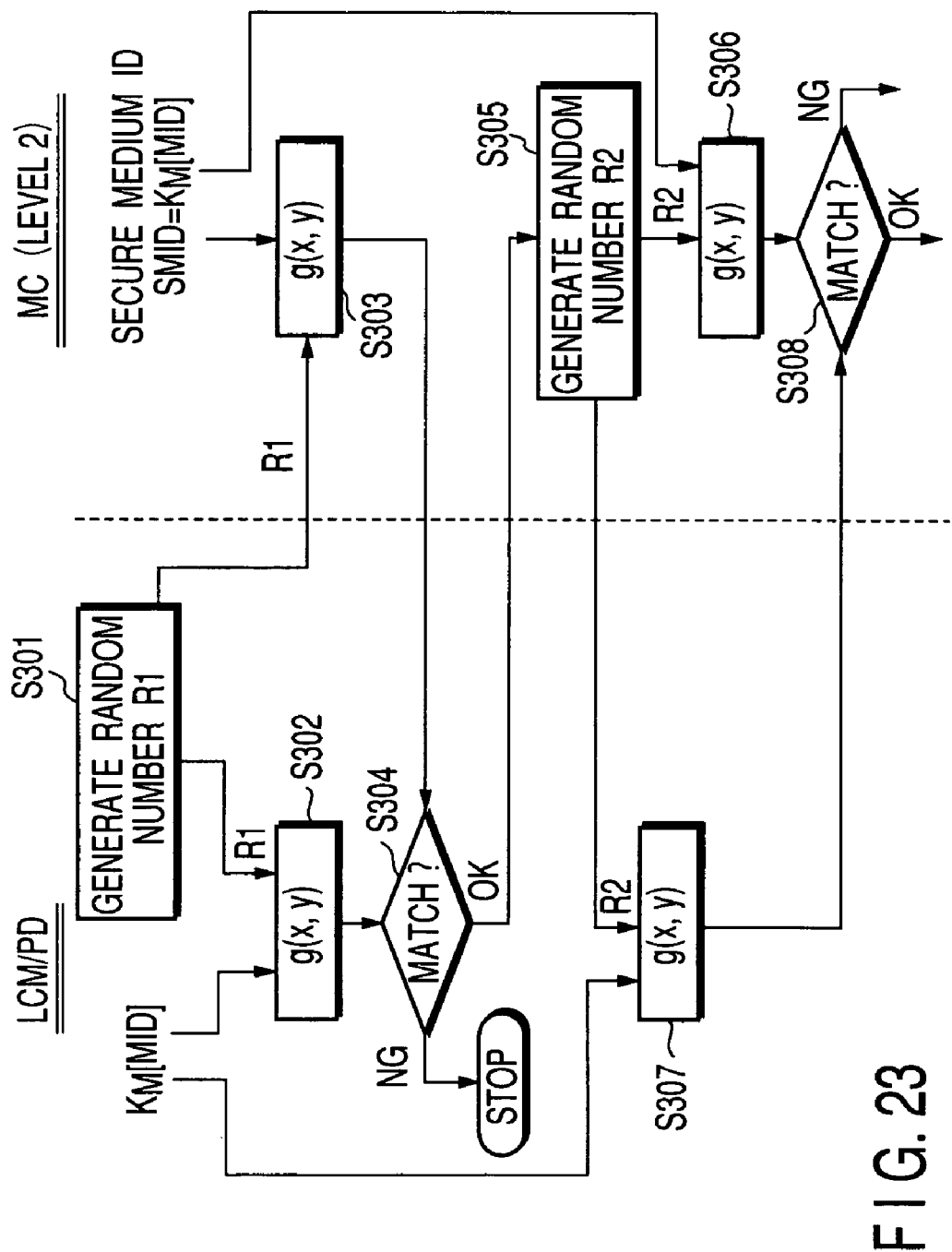
F I G. 23

CONTENTS MANAGEMENT METHOD, CONTENT MANAGEMENT APPARATUS, AND RECORDING MEDIUM

CROSS-REFERENCE TO RELATED APPLICATIONS

This application is based upon and claims the benefit of priority from the prior Japanese Patent Application No. 11-196207, filed Jul. 9, 1999, the entire contents of which are incorporated herein by reference.

BACKGROUND OF THE INVENTION

The present invention relates to a contents management method for protecting copyrights by limiting the number of copied contents and a contents management apparatus using the same and, more particularly, to an erase method of copied contents recorded on a recording medium.

Conventionally, contents (literary works and the like) have undergone copy management. More specifically, by managing copy generations or the number of copies, copyright protection and use are balanced.

On the other hand, the concept "move" has appeared as an alternative to copy management. "Copy" does not erase original data, but "move" transfers data to another location (recording medium (media)) and erases original data. Thus, a protection technique against "move" has appeared. Such technique has emerged due to digitization of contents and prevalence of networks and the like.

In recent years, since copies faithful to an original can be formed via the network or the like, it is becoming increasingly difficult to protect copyrights by only copy management. Also, copyrights cannot be managed against unlimited moves from media to media, e.g., commercial distribution (by means of move) of data.

Under the circumstance, it has become hard to reliably protect copies of original data (especially, contents, copyright of which must be protected).

Especially, in contents management for copyright protection in which copied contents are recorded on and erased from a recording medium while limiting the number of copied contents, the copied contents recorded on a given recording medium must be surely erased upon moving the copied contents recorded on that recording medium. In this case, unlike recording of copied contents, the copied contents can be easily avoided from being erased from the recording medium by cutting a signal or the like so that a third party does not receive a command or the like for erasing the copied contents, in that procedure.

BRIEF SUMMARY OF THE INVENTION

It is an object of the present invention to provide a contents management method which can reliably and safely erase content recorded on a recording medium in a content management in which content is recorded on and erased from the recording medium while limiting the number of copied content to be recorded on the recording medium, a contents management apparatus using the method, and a recording medium.

The first feature of the present invention lies in that first data used to erase by rewriting(overwriting) information used for decrypting content recorded on a recording medium is encrypted using first shared information generated by bilateral authentication, the encrypted first data is transferred to a partner to be communicated, when second data, which was used in rewrite(overwrote) by the partner and encrypted using second shared information generated by another bilateral authentication, is transferred from the partner, the second data is decrypted using the second shared information, and the decrypted second data is compared with the first data to confirm if the information used for decrypting the content recorded on the recording medium has been erased.

According to the present invention, for example, an attack by a third party that hinders reception of a command for erasing content can be reliably avoided, content recorded on a recording medium can be reliably and safely erased, and the number of contents recorded on the recording medium can be easily and reliably managed.

The second feature of the present invention lies in that after instruction for erasing information used for decrypting content recorded on a recording medium is encrypted using shared information generated by bilateral authentication and is transferred to partner to be communicated, when another bilateral authentication is successful, making the other execute the instruction.

According to the present invention, for example, an attack by a third party that hinders reception of a command for erasing content can be reliably avoided, content recorded on a recording medium can be reliably and safely erased, and the number of contents recorded on the recording medium can be easily and reliably managed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view for explaining the recorded content of a recording medium after check-in;

FIG. 14 is a chart for explaining still another sequence upon check-out when the type of recording medium is level 2;

FIG. 23 is a chart for explaining another processing operation of a bilateral authentication process (AKE)

DETAILED DESCRIPTION OF THE INVENTION

An embodiment of the present invention will be explained hereinafter with reference to the accompanying drawings.

Figure 1:
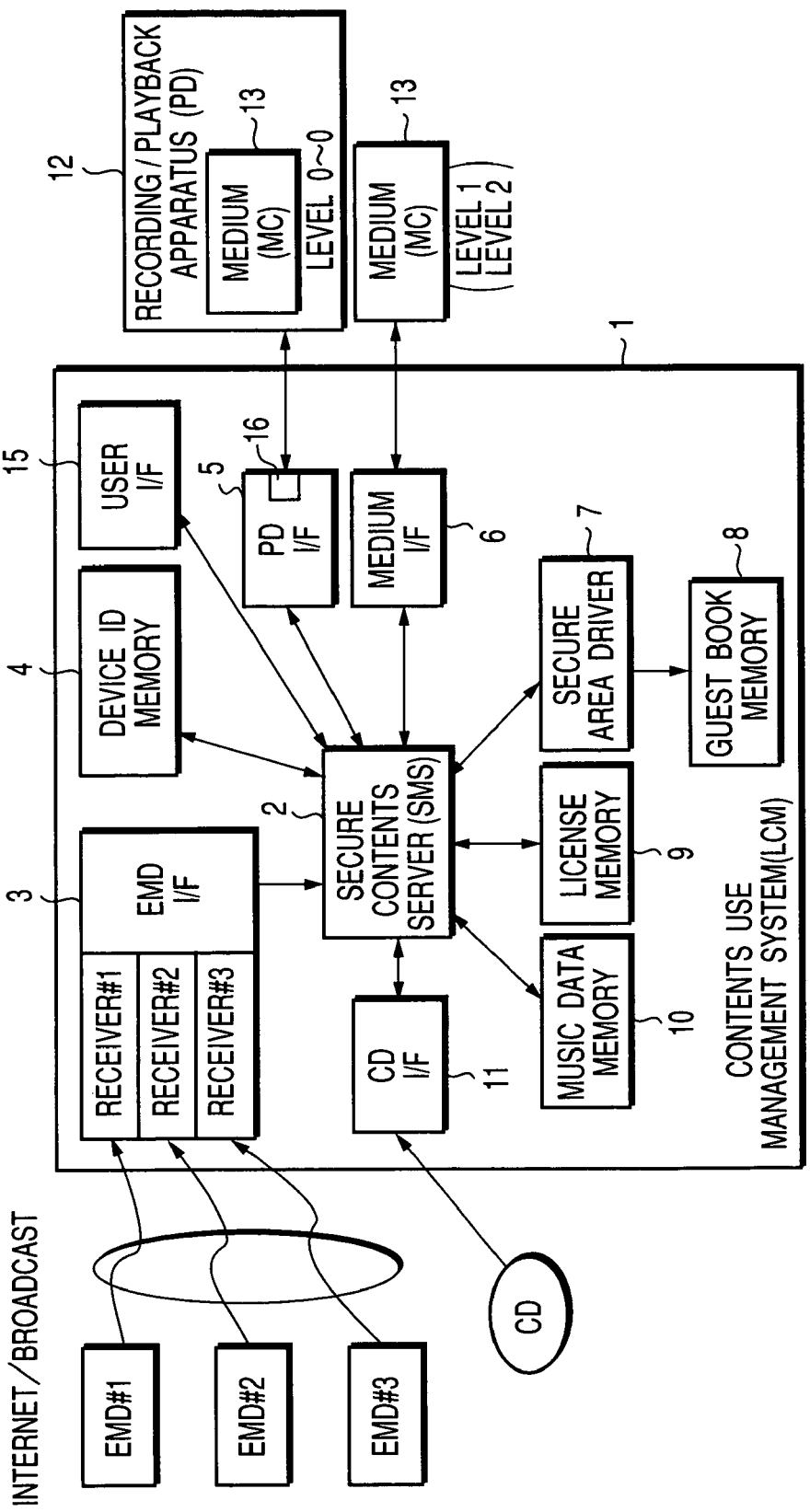
FIG. 1 is a block diagram showing an example of the arrangement of a music contents use management system (LCM) using a contents management technique for limiting the number of copied contents that can be recorded on a recording medium according to an embodiment of the present invention.

FIG. 1 shows an example of the arrangement of a music contents use management system (to be also simply referred to as an LCM (Licensed Compliant module) hereinafter) which limits the number of copied contents that can be recorded on a recording medium according to this embodiment, and records copied content on a medium, plays back copied content recorded on a medium, and so forth. Note that music is used as an example of content. However, the present invention is not limited to such specific content, and movies, game software programs, and the like may be used. A memory card (MC) is used as a medium. However, the present invention is not limited to such medium, and various other recording media such as a floppy disk, DVD, and the like may be used.

An EMD (Electronic Music Distributor) is a music distribution server or music distribution broadcast station.

A contents use management system 1 is, for example, a personal computer (PC), which comprises receivers #1 to #3 corresponding to a plurality of EMDs (EMD#1 to EMD#3 in this case), and receives encrypted contents, their licenses (the use condition and decryption key Kc for the encrypted content), and the like distributed by the EMDS. Receivers #1 to #3 may have a playback function or a charging function. The user uses the playback function to listen to samples of the distributed music content. Also, the user can purchase the content he or she likes using the charging function.

The LCM 1 comprises a secure contents server (Secure Music Server: SMS in this case; to be also simply referred to as an SMS hereinafter) 2, and the content the user has purchased are stored in the SMS 2 via an EMD interface (I/F) 3. The music contents are decrypted by the EMD I/F 3 as needed, and undergo format conversion and re-encryption. Upon receiving the encrypted content, the SMS 2 stores the received contents in a music data memory 10, and a music data decryption key in a license memory 9. The SMS 2 may have a playback function. With this playback function, the music contents managed by the SMS 2 can be played back on the PC.

The SMS 2 has a function of outputting content data to a medium (to be also simply referred to as an MC (memory card) hereinafter) 13. The user can play back the content recorded on the MC 13 by setting it in a recording/playback apparatus (to be also simply referred to as a PD (Portable/Personal Device) hereinafter).

The SMS 2 records content on the MC 13 directly via a medium (MC) interface 6 or with the intervention of the PD 12.

A device ID memory 4 comprises, e.g., a ROM which stores identification information (device ID) of the LCM.

The MC 13 has identification information (MID) which is unique to that medium and cannot be rewritten, and the content stored in the MC 13 may be encrypted by an encryption key which depends on the MC 13.

A check-in/check-out process will be explained first using the LCM 1 shown in FIG. 1.

The check-out process means making a copy of "parent" content stored in the LCM 1 on the MC 13 as "child" content. The "child" content can be freely played back by the PD 12, but it is not allowed to form "grandchild" content from the "child". The number of "children" a "parent" can have is defined as an attribute of "parent". On the other hand, the check-in process is to connect the MC 13 to the LCM 1 and erase (or disable to use) "child" content by the LCM 1, i.e., to recover the right of "parent" content in the LCM 1 to form one "child". This process is also called check-in at "parent".

When this check-in/check-out process is simply implemented by the conventional LCM 1, the following "attack" is present in practice. More specifically, "child" stored in the MC 13 is saved in another recording medium (by removing its MID), and "child" in the MC 13 checks in at "parent". The previously saved "child" is written back to that MC 13. Since check-in has already been done, "parent" on the LCM 1 can copy "child" on another MC 13. This method can form an arbitrary number of "children" that can be used.

The aforementioned "attack" can be defended by authentication upon data transfer between the MC 13 and LCM 1. That is, assume that the MC 13 does not accept data transfer from an LCM other than an authentic LCM 1, and the LCM 1 does not accept data transfer from an MC other than an authentic MC 13. In this case, "child" in the MC 13 cannot be saved in another recording medium. Also, disguised check-in cannot be done at the LCM 1. Therefore, the aforementioned "attack" is no longer effective.

However, the check-in/check-out process cannot be implemented even under the premise of authentication between the LCM 1 and MC 13, because of the presence of the following "attack". That is, before "parent" on the LCM 1 forms any "child", data of the LCM 1 (especially, information in the license memory 9) is backed up to another recording medium. After "child" is copied to the MC 13, the backed-up data of the LCM 1 is restored. Since "parent" of the LCM 1 recovers the state before it forms "child", it can form "child" on another MC 13. In this manner, an arbitrary number of "children" can be formed.

Figure 2:
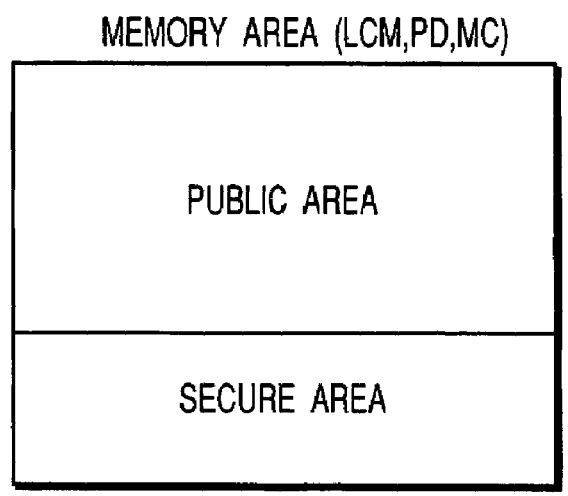
FIG. 2 shows an example of the map of a memory area.

In order to implement the check-in/check-out process that can defend against such attack, an area (secure area) which cannot be accessed by a public procedure is on the storage area of the MC 13, and is used to record information required for bilateral authentication and information required for content decryption, an identification information (device ID) list (revocation list (RVC list)) of devices (LCM 1, PD 12) that cannot be accessed, and the like (see FIG. 2). Also, an area (secure area) that can be accessed by only a private procedure is on the storage area (e.g., a hard disk (HDD) when the LCM 1 comprises a PC) of the LCM 1, and is used to store a guest book (to be described later) (see FIG. 2). Furthermore, an area (secure area) that can be accessed by only a private procedure may also be on the storage area of the PD 12, and may be used to record information required for content decryption (see FIG. 2). Note that an area other than the secure area in the storage area, which can be accessed by a normal procedure, will be referred to as a public area.

As shown in FIG. 1, the LCM 1 comprises a guest book memory 8 on the secure area, and a secure area driver 7 for reading data from the secure area after the SMS 2 executes a specific secure procedure for accessing this guest book memory 8.

Figure 4A:
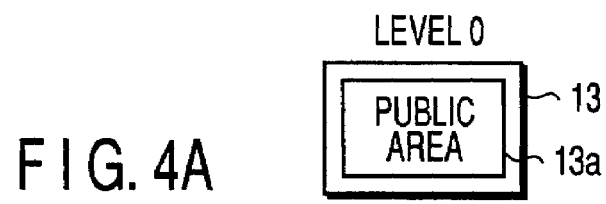
FIGS. 4A to 4C are views for explaining the features of three different recording media.
Figure 4B:
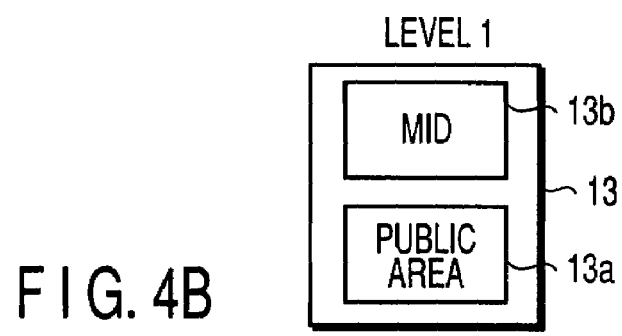
Figure 4C:
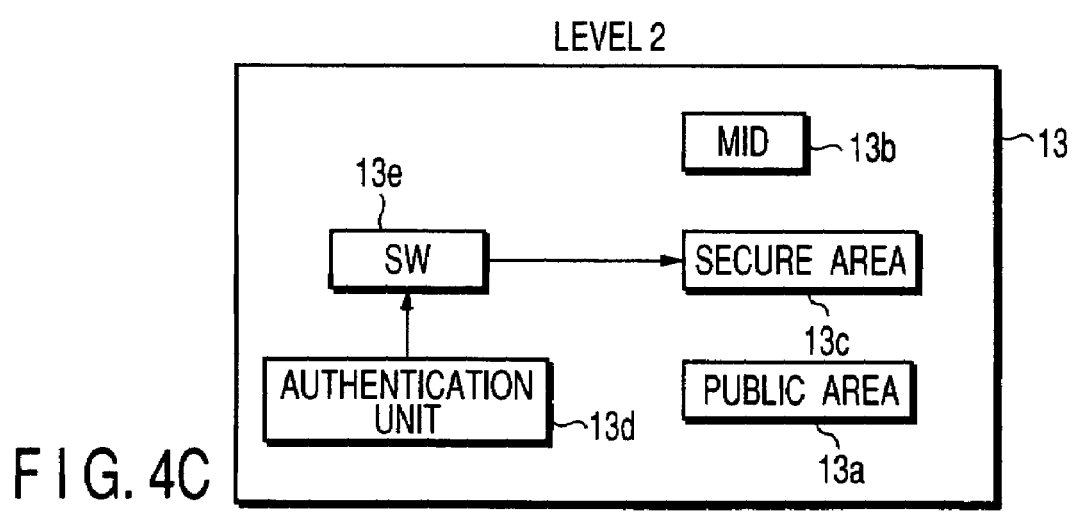

As shown in FIG. 4C, the MC 13 comprises an identification information memory (ROM) 13b which stores identification information MID of the MC 13, and cannot be externally rewritten and copied, a secure area 13c, a public area (rewritable RAM) 13a, and a switch (SW) 13e which opens a gate to allow access to the secure area 13c only when an authentication unit 13d authenticates and confirms an authentic partner every time the secure area 13c is accessed.

Note that three different types of MCs 13 can be used in this embodiment. The type of MC 13 which has both identification information MID and the secure area, as shown in FIG. 4C, is called "level 2". The type of MC 13 which does not have any secure area but has identification information MID, as shown in FIG. 4B, is called "level 1". The type of MC 13 which has neither the secure area nor identification information, and has only a public area, as shown in FIG. 4A, is called "level 0". In order to discriminate these types, for example, level 0 can be discriminated from other types by checking the presence/absence of identification information MID, and levels 1 and 2 can be discriminated based on the format of identification information MID. For example, when identification information is a serial number, a medium having identification information equal to or larger than a predetermined value is determined to be level 2.

An MC 13 of level 2 will be exemplified below unless otherwise specified.

The MC 13 is set in the PD 12 connected to the LCM 1 or is directly set in the LCM 1 when it is used.

Figure 3:
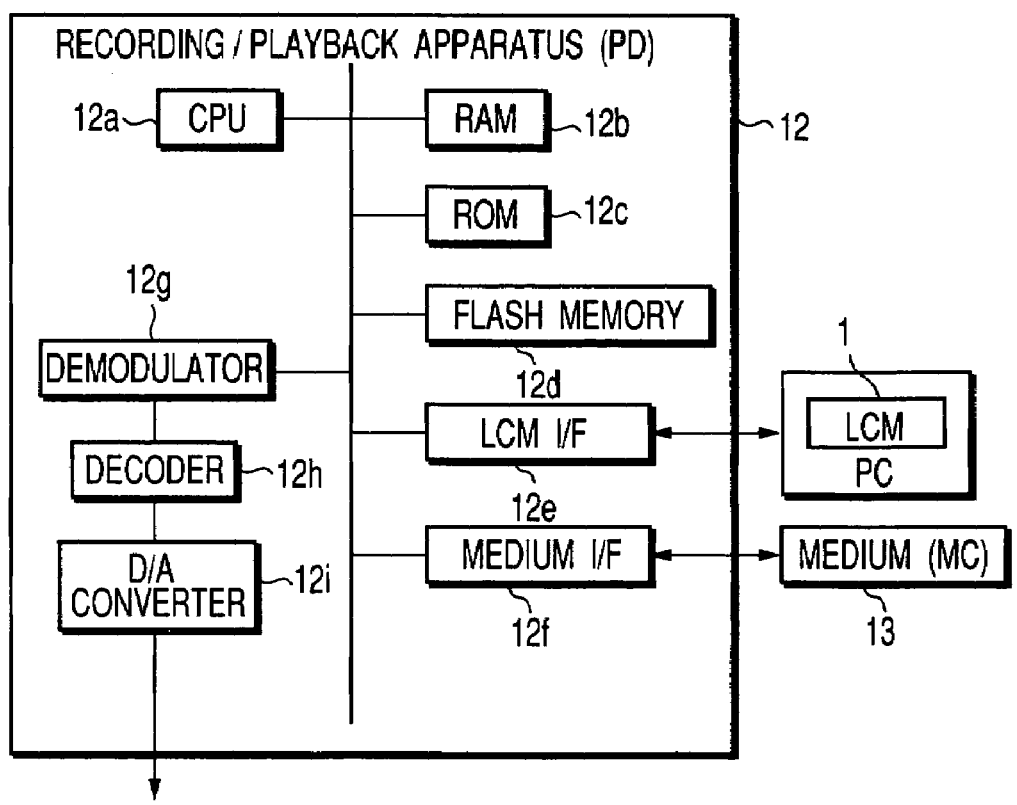
FIG. 3 is a block diagram showing an example of the internal arrangement of a recording/playback apparatus (PD)

FIG. 3 shows an example of the arrangement of the PD 12, and the MC 13 is set in a medium interface (I/F) 12f. When the LCM 1 reads/writes data to/from the MC 13 via the PD 12, it accesses the secure area of the MC 13 via a secure area access unit in the PD 12. The medium I/F 12f comprises a secure area access unit for accessing the secure area of the MC 13. The secure area in the PD 12 may be on a flash memory 12d. A bilateral authentication program between the MC 13 and LCM 1, a program that describes an authentication procedure required for accessing the secure area, and a program for discriminating the type of MC 13 are written in a ROM12c. According to these programs, various processes such as authentication, type discrimination, and the like with the MC 13 are executed under the control of a CPU 12a.

The ROM 12c may also store identification information (device ID) of the PD 12. For example, the secure area is on the flash memory 12d pre-stores a secure device ID (SP-DID).

Figure 5:
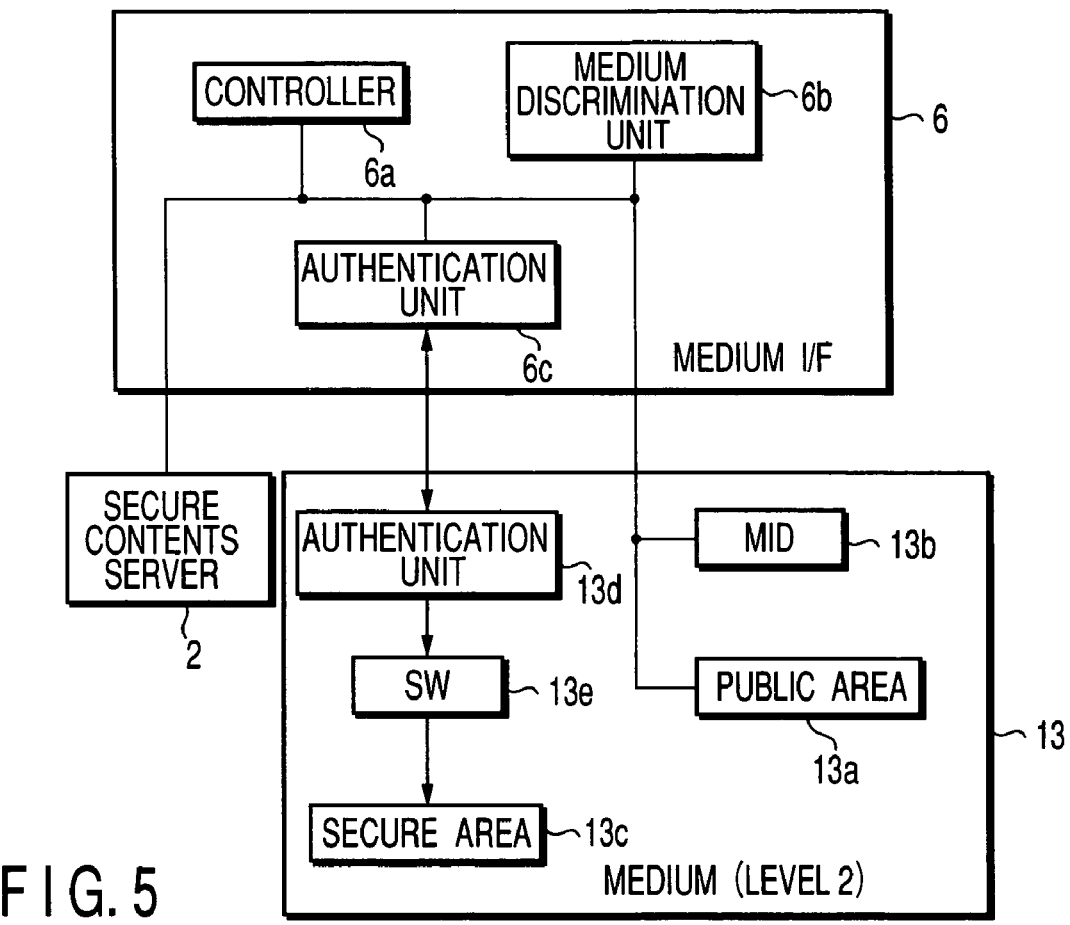
FIG. 5 is a block diagram showing an example of the internal arrangement of a medium interface (I/F)

FIG. 5 shows the arrangement of the medium I/F 6 of the LCM 1. The medium I/F 6 comprises an authentication unit 6c for performing bilateral authentication with the MC 13, a medium discrimination unit 6b for determining the type of MC 13, and a controller 6a for controlling all these units. The authentication unit 6c also serves as a secure area access unit which accesses the secure area of the MC 13.

Figure 24:
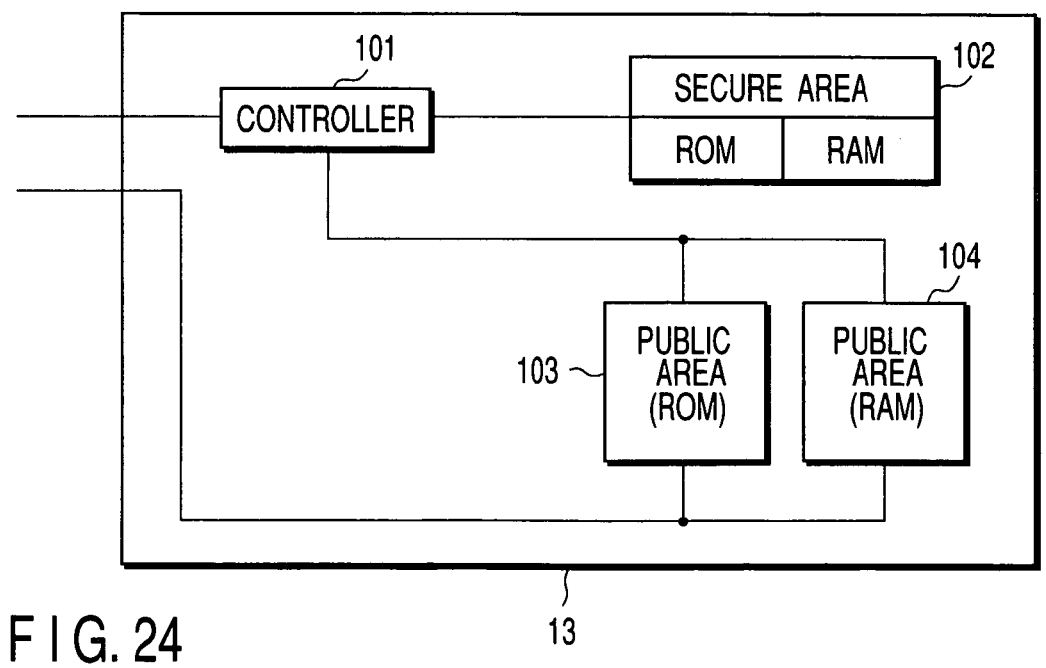
FIG. 24 shows the arrangement of a recording medium of level 2 shown in FIG. 4C in more detail.

FIG. 24 shows the arrangement of the MC 13 of level 2 shown in FIG. 4C in more detail. As shown in FIG. 24, a secure area 102 is on a 1-chip memory element (e.g., a RAM), and has RAM and ROM areas. For example, the RAM and ROM areas are distinguished based on access control differences of a controller 101 comprising, e.g., a CPU or the like. Public areas are on a ROM area 103 and a RAM area 104.

Independent buses for accessing the secure area 102 and the public areas 103 and 104 are connected to the controller 101. Controller 101 accesses the secure area 102 or the public areas 103 and 104 by selecting one of these buses.

The controller 101 controls each section of the MC 13, and also executes an authentication process (AKE) which is executed every time the LCM 1 or the like accesses the secure area of the MC 13.

The ROM area in the secure area 102 pre-stores a bilateral authentication program between the MC 13 and LCM 1, a program that describes an authentication process (AKE) required for accessing the secure area, a secure medium ID (SMID), and the like.

The guest book stored in the secure area of the LCM 1 will be explained below.

All music content held in the SMS 2 have content IDs (TIDS) as identification information for identifying the individual content, and the predetermined number of content that can be copied (i.e. the remaining number of children and a check-out list) as their attribute information. This attribute information is called a guest book. The guest book is recorded on the guest book memory 8 on the secure area in the format shown in FIG. 7A.

Figure 7A:
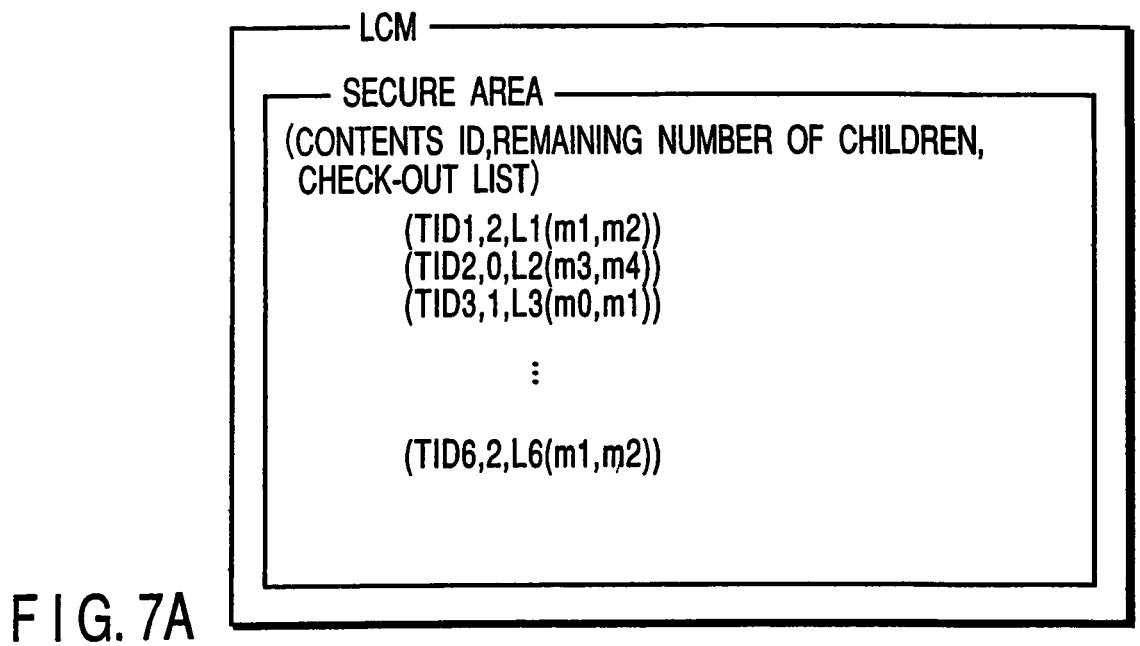
FIGS. 7A to 7C show storage examples of guest books stored in a secure area of an LCM.

Referring to FIG. 7A, the remaining number of children of content ID="TID1" is "2" and its check-out list is L1.

The check-out list is a list of identification information of the MCs 13 which record copied content (children). For example, as can be seen from check-out list L1 in FIG. 7A, children of the content having a content ID="TID1" are checked out to two MCs 13 respectively having identification information="m1" and "m2".

The following items will be explained in turn below.

(1) Outline of bilateral authentication method (2) Check-in/check-out/playback process of copied content using MC of level 2

(3) Check-in/check-out/playback process of copied content using MC of level 0

(1) Outline of Bilateral Authentication Method

As described above, in order to safely implement the check-in/check-out process, bilateral authentication must be done among the LCM 1, PD 12, and MC 13 (to confirm, e.g., if they have an identical algorithm). In general, the bilateral authentication process must have secret information shared by the partners which are to authenticate each other. Therefore, for example, the MC 13, LCM 1, and PD 12 have such secret information. In terms of information security, this secret information is preferably generated dynamically to have a different value every time authentication is done. However, when a high-grade function of generating such secret information is added to the medium itself, the medium (i.e. the MC 13) becomes expensive. In order to popularize this kind of media to general public, the medium is preferably as inexpensive as possible. Therefore, secret information is preferably pre-stored in the MC 13 to reduce its cost.

Figure 8A:
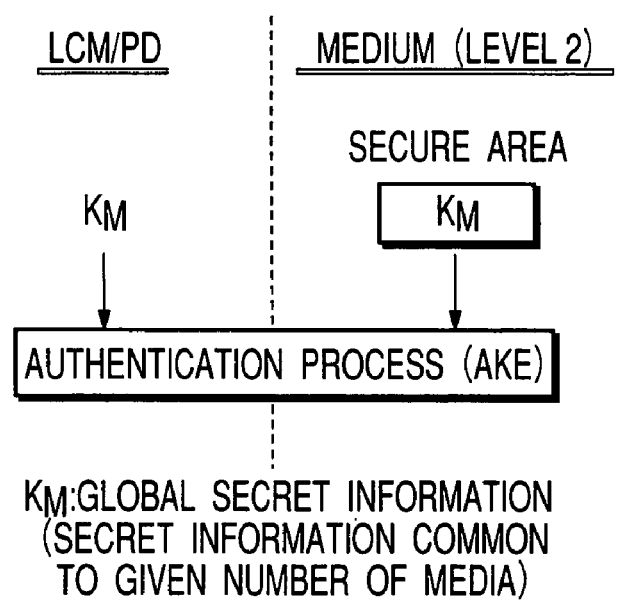
FIGS. 8A and 8B are views for explaining an outline of a bilateral authentication method.

However, when secret information which is common to all media or a given number of media (such information will be referred to as global secret information hereinafter) is pre-stored in respective media, if the secret information is read from a given medium by some method, other media that store identical secret information may be used by unauthorized persons. It is therefore very dangerous to store global secret information in media (see FIG. 8A).

Even when secret information stored in a given medium is read by an unauthorized user, if it is only the medium from which the secret information has been read that can be used by unauthorized persons, no serious problem is posed. For this reason, the secret information required to be unique to each medium.

Figure 8B:
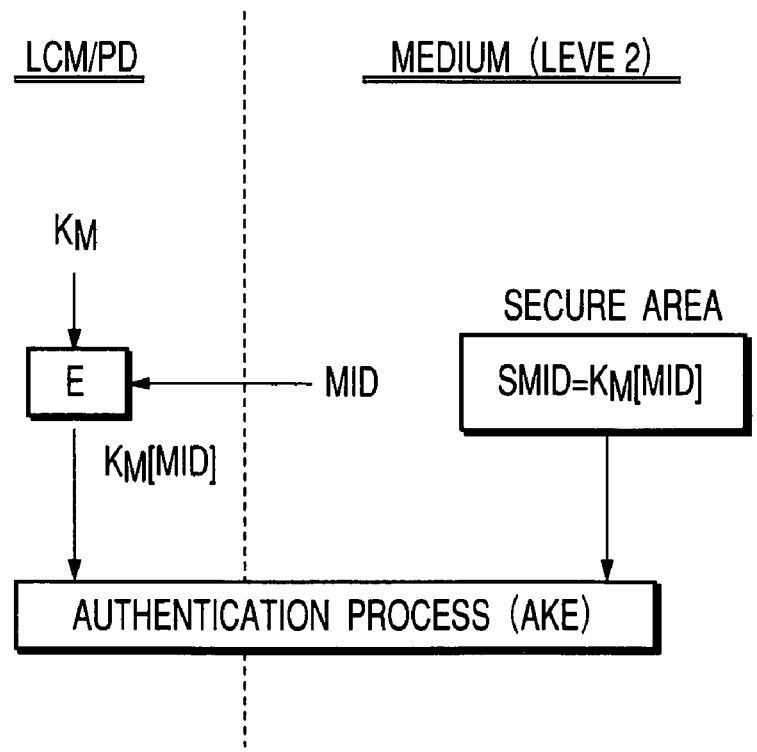

In this embodiment, secret information for bilateral authentication, which differs in units of media, is stored in each media, and the LCM 1 or PD 12 and MC 13 perform bilateral authentication using the stored information, thus providing a safe bilateral authentication method that uses a low-cost medium and can assure higher security. More specifically, in this embodiment, we describes the bilateral authentication method that secret information (in this case, secure medium ID (SMID): which is obtained by encrypting a medium ID using key information KM acquired by some method) which differs in units of media and is required for bilateral authentication (AKE) is pre-stored in (the secure area of) each medium (medium of level 2) and, as shown in FIG. 8B, and the identification information (MID) of that medium is transferred to the LCM 1 and PD 12, and the LCM 1 or PD 12 generates information (which is the same as SMID of the medium) for bilateral authentication) using MID and information (KM) acquired by some method in accordance with a predetermined algorithm, and executes a bilateral authentication process (AKE: authentication and key exchange).

In this manner, by storing unique secret information (SMID) in each MC 13, the LCM 1 or PD 12 generates secret information (SMID) on the basis of information (MID) unique to each medium, which is transferred from the medium, thus implementing safe bilateral authentication without imposing any heavy load on the medium.

Note that the aforementioned bilateral authentication process will be referred to as AKE hereinafter.

Figure 9:
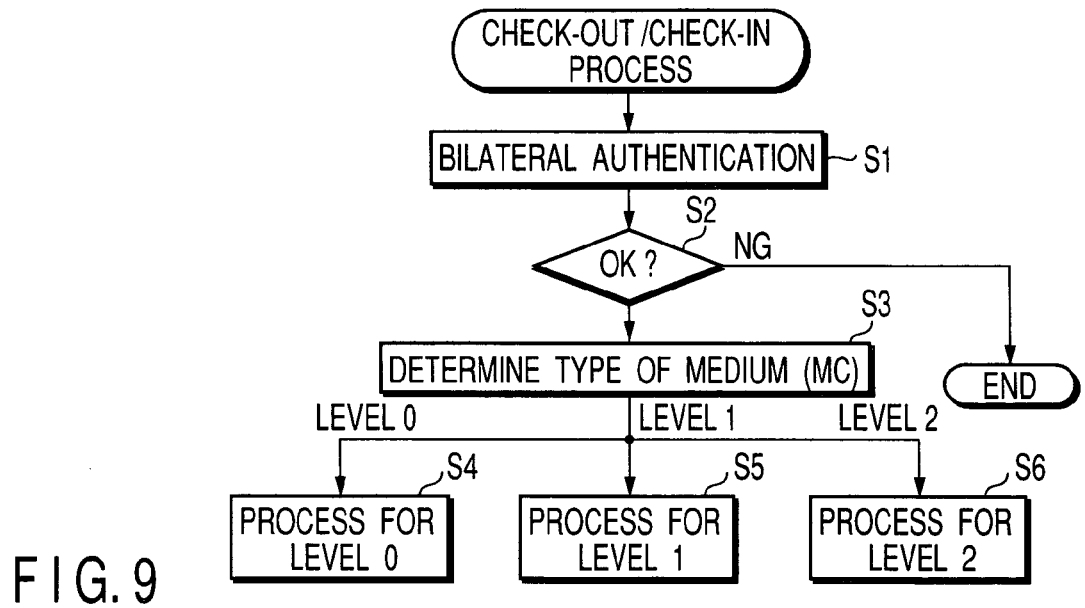
FIG. 9 is a flow chart for explaining a check-in/check-out process sequence, and showing the sequence until the type of medium is checked, and a process corresponding to the determined type is selected.

When the MC 13 is set in the medium I/F 6 of the LCM 1 or the PD 12, bilateral authentication may be done first between the medium I/F 6 and MC 13 or between the PD 12 and MC 13 (step S1 in FIG. 9). If it is determined that both of them are authentic (e.g., they have hardware arrangements complying with the same standards) (step S2), the medium I/F 6 or PD 12 determines the type of MC 13 on the basis of identification information MID read from the MC 13 (step S3). The medium I/F 6 or PD 12 executes a check-in/check-out/playback process according to the determined type (steps S4 to S6).

Note that bilateral authentication in step S1 in FIG. 9 need not always be that according to the gist of the present invention shown in FIG. 8B.

In the above description, three different types of MCs 13 (i.e. MCs 13 of level 0 to level 2), are available, but the check-in/check-out playback process operations of the copied content in FIG. 9 and the subsequent figures will be explained for two types of MCs 13 (i.e. MCs 13 of level 0 and level 2).

Furthermore, although not described in the following description, upon accessing each others secure areas between the LCM 1 and MC 13, the LCM 1 and PD 12, and the PD 12 and MC 13, assume that they authenticate each other, open gates to each other's secure areas if it is confirmed that they are authentic, and close the gates that allow access to the secure areas after access to the secure areas is completed. For example, between the LCM 1 and MC 13, the SMS 2 makes bilateral authentication with the MC 13 so as to access the secure area 13c of the MC 13. If their authenticity is confirmed and the switch 13e (see FIG. 5) opens the gate to the secure area 13c, the SMS 2 writes key information in the secure area 13c, and the switch 13e closes the gate that allows access to the secure area 13c upon completion of the write.

(2) Check-In/Check-Out/Playback Process of Copied Content Using MC of Level 2

The check-in/check-out/playback process using the MC 13 of level 2 with the format shown in FIG. 4C will be explained below.

A case will be explained below with reference to FIG. 10 wherein a check-out instruction is issued to the SMS 2 via a user interface (I/F) 15 or via the PD 12 (i.e., when the MC 13 is set in the PD 12 connected to the LCM 1).

The SMS 2 checks the remaining number n of children of content (the content having a content ID="TID1") corresponding to a check-out request of the guest book. If n>0, the SMS 2 reads out the device ID (LCMID) of the corresponding LCM 1 from the device ID memory 4, and transfers it to the MC 13 (step S101).

The MC 13 checks if the transferred device ID is registered in the RVC list (step S102). If the transferred device ID is not registered, the MC 13 reads out master key KM by accessing the secure area 13c, and transfers it to the LCM 1 (step S103). Furthermore, the MC 13 reads out its identification information (MID) from the identification information memory 13b and transfers it to the LCM 1 (step S104).

The LCM 1 encrypts the medium ID (MID) transferred from the MC 13 using master key KM to generate information (KM[MID]) required for a bilateral authentication process (AKE) (step S105).

The LCM 1 executes the bilateral authentication process (AKE) using the generated information KM[MID], while the MC 13 executes the bilateral authentication process (AKE) using a secure medium ID (SMID) (step S106). In this bilateral authentication process (AKE), the LCM 1 and MC 13 share identical functions g(x, y) and H(x, y), and if the information KM[MID] generated by the LCM 1 is the same as the secure medium ID (SMID) of the MC 13, they can confirm their authenticity by the bilateral authentication process (AKE).

The processing operation of the bilateral authentication process (AKE) in step S106 will be explained below with reference to FIG. 22.

The LCM 1 generates random number R1 (step S301), and transfers it to the MC 13. At the same time, the LCM 1 substitutes random number R1 in one variable of function g(x, y) having two variables. Also, the LCM 1 substitutes the information KM[MID] generated in step S105 in FIG. 10 in the other variable of function g(x, y), to obtain the value of function g (step S302).

On the other hand, the MC 13 substitutes random number R1 transferred from the LCM 1 in one variable of function g(x, y), substitutes its own secure medium ID (SMID) in the other variable, and transfers the obtained value of function g to the LCM 1 (step S303).

The LCM 1 compares the value of function g transferred from the MC 13, and the value of function g that computed by itself, and executes a subsequent process if they match. If the two values do not match, the AKE process on the LCM 1 side is canceled at that time (step S304).

The MC 13 then generates random number R2 (step S305), and transfers it to the LCM 1. At the same time, the MC 13 substitutes random number R2 in one variable of function g(x, y) having two variables. Also, the MC 13 substitutes its secure medium ID (SMID) in the other variable of function g(x, y) to obtain the value of function g (step S306).

Figure 10:
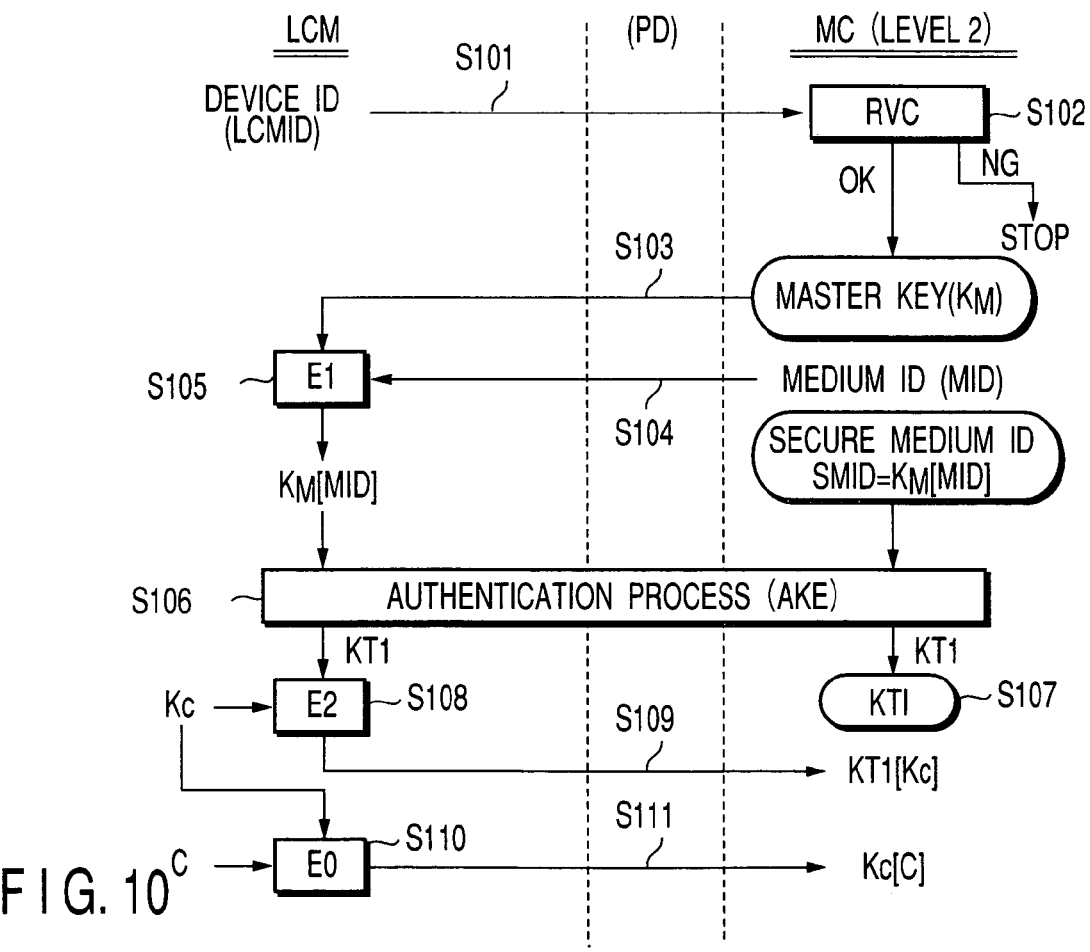
FIG. 10 is a chart for explaining a sequence upon check-out when the type of recording medium is level 2.

On the other hand, the LCM 1 substitutes random number R2 transferred from the MC 13 in one variable of function g(x, y), and substitutes the information KM[MID] generated in step S105 in FIG. 10 in the other variable of function g(x, y), to obtain the value of function g. The LCM 1 then transfers the obtained value to the MC 13 (step S307).

The MC 13 compares the value of function g transferred from the LCM 1, and the value of function g that computed by itself, and executes a subsequent process if they match. If the two values do not match, the AKE process on the MC 13 side is canceled at that time (step S308).

If the values of function g match in step S308, the MC 13 substitutes random number R2 in one variable of function H(x, y) having two variables, and its secure medium ID (SMID) in the other variable, to generate key information KT (step S309).

Also, if the values of function g match in step S304, the LCM 1 substitutes random number R2 transferred from the MC 13 in one variable of function H(x, y), and substitutes the information KM[MID] generated in step S105 in FIG. 10 in the other variable, to generate key information KT (step S310).

Note that two pieces of key information KT, which are generated by the LCM 1 and MC 13 using the identical function H(x, y) if it is determined in steps S304 and S308 that the values of function g match, are the same. The LCM 1 and MC 13 then exchange content decryption key Kc using this key information KT.

The bilateral authentication process (AKE) preferably generates different key information KT upon each authentication in terms of security. In this case, since random number R2 newly generated for each authentication is substituted in one of two variables in function H used to generate key information KT, different key information KT can be generated for each authentication.

Referring back to FIG. 10, if the LCM 1 and MC 13 confirm in step S106 that they are authentic, the MC 13 stores the generated key information KT (in this case, KT1) in the secure area (step S107). The LCM 1 encrypts a decryption key (content decryption key) Kc used to decrypt the encrypted content (KT1[Kc]) using the key information KT1 generated in step S106, and transfers it to the MC 13 (steps S108 and S109). Also, the LCM 1 encrypts content information C using Kc (then generates Kc[C]), and transfers the encrypted content (Kc[C]) to the MC 13 (steps S110 and S111).

Figure 7B:
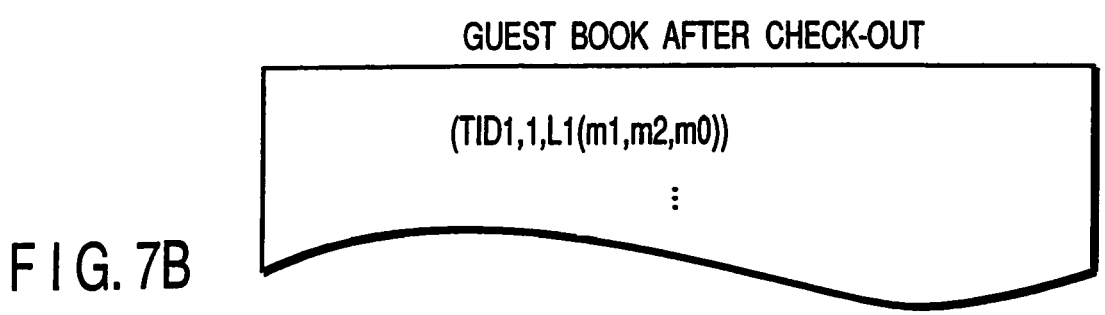

Finally, the SMS 2 subtracts "1" from the remaining number n of children of the check-out requested content having content ID="TID1" in the guest book, and adds identification information of MC3 "m0" in check-out list L1, as shown in FIG. 7B.

The MC 13 stores transferred encrypted content decryption key KT1[Kc] and encrypted content Kc[C] in the public area 13a.

Figure 6:
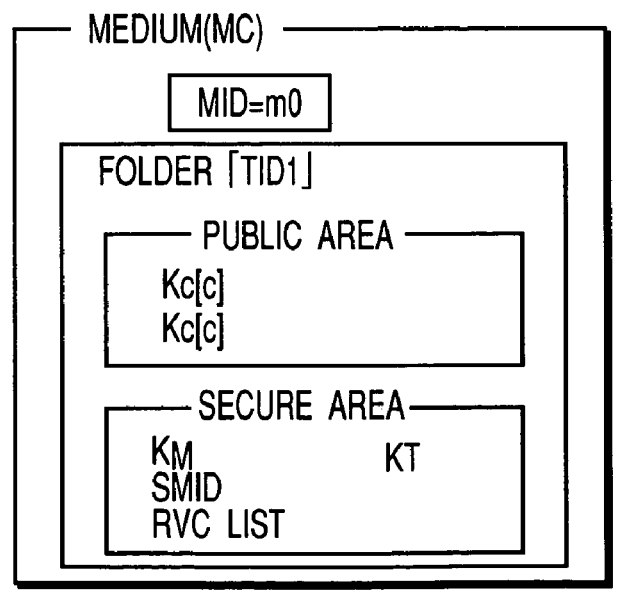

FIG. 6 shows the storage contents of the MC 13 upon completion of the aforementioned processes.

Figure 11:
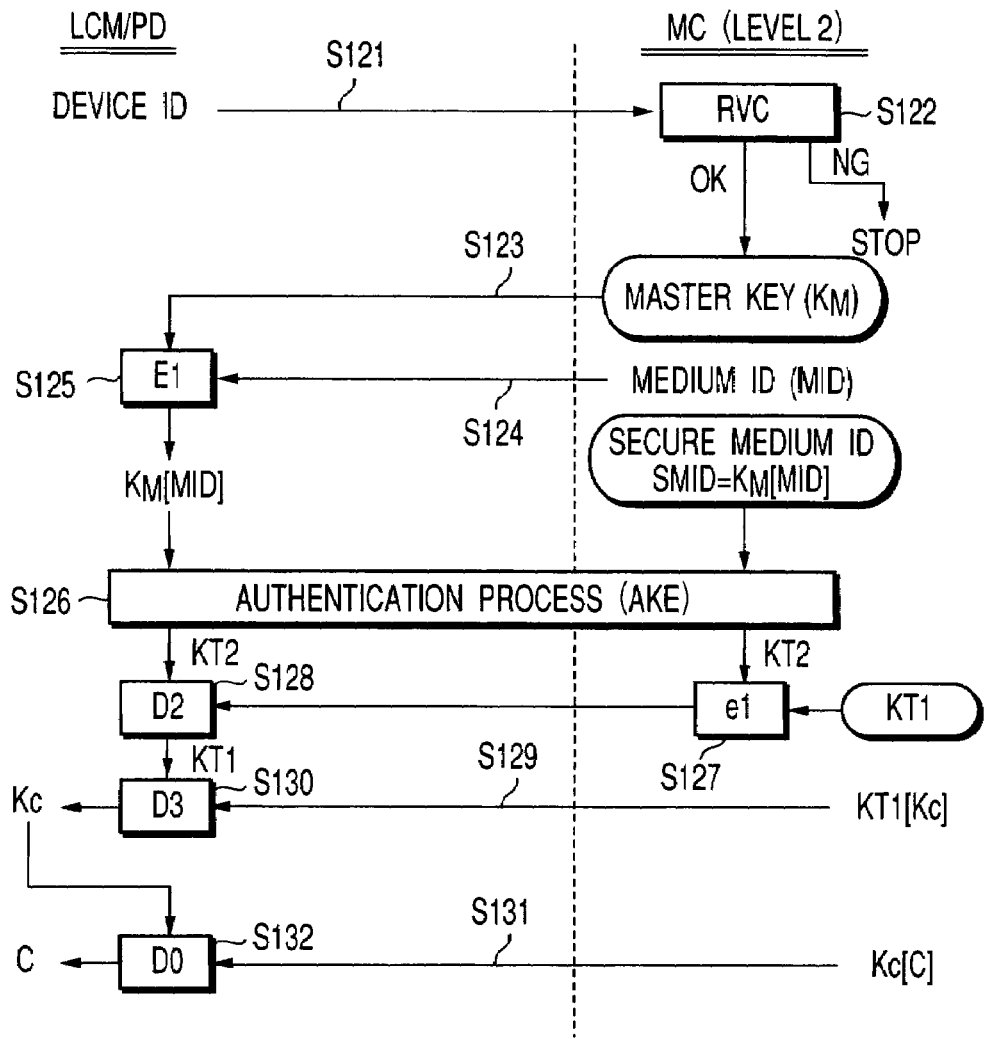
FIG. 11 is a chart for explaining a sequence upon playback when the type of recording medium is level 2.

A case will be explained below with reference to FIG. 11 wherein a playback instruction is issued to the SMS 2 via the user interface (I/F) 15 of the LCM 1 or to the PD 12.

The PD 12 or LCM 1 transfers its own device ID to the MC 13 (step S121).

If the LCM 1 has the same content playback function (demodulator 12g, decoder 12h, D/A converter 12i, and the like) as that the PD 12 shown in FIG. 3, the content of the MC 13 can be similarly played back by the PD 12 and LCM 1. Then a playback process by the PD 12 will be exemplified below.

The MC 13 checks if the transferred device ID is registered in the RVC list (step S122). If the device ID is not registered, the MC 13 reads out master key KM by accessing the secure area 13c, and transfers it to the PD 12 (step S123). Furthermore, the MC 13 reads out its identification information (MID) from the identification information memory 13b and transfers it to the PD 12 (step S124).

The PD 12 encrypts the medium ID (MID) transferred from the MC 13 using master key KM to generate information (KM[MID]) required for a bilateral authentication process (AKE) (step S125).

The PD 12 executes the bilateral authentication process (AKE) using the generated information KM[MID], while the MC 13 executes the bilateral authentication process (AKE) using a secure medium ID (SMID) (step S126). Since the bilateral authentication process in step S126 is the same as that shown in FIG. 22, a description thereof will be omitted.

If the PD 12 and MC 13 confirm that they are authentic, the MC 13 encrypts key information KT1 stored in the secure area 13c using the generated key information KT (in this case, KT2) (KT2[KT1]) and transfers it to the PD 12 (steps S127 and S128). On the other hand, the PD 12 can decrypt KT2[KT1] transferred from the MC 13 using key information KT2 generated in step S126 (step S128).

The MC 13 reads out encrypted content decryption key KT1[Kc] and encrypted content Kc[C] from the public area 13a and transfers them to the PD 12 (steps S129 and S131).

If key information KT1 has been successfully decrypted, since the PD 12 can obtain content decryption key Kc by decrypting content decryption key KT1[Kc] which was encrypted using KT1 (step S130), it decrypts encrypted content Kc[C] using that content decryption key Kc to obtain content C (step S132). In the PD 12, the decoder 12h decodes content C, and the D/A converter 12i converts the decoded content from a digital signal into an analog signal, thus playing back the copied content (e.g., music) recorded on the MC 13 (see FIG. 3).

A case will be explained below with reference to FIG. 12 wherein a check-in instruction is issued to the SMS 2 via the user interface (I/F) 15 of the LCM 1 or via the PD 12 (i.e., when the MC 13 is set in the PD 12 connected to the LCM 1).

Figure 12:
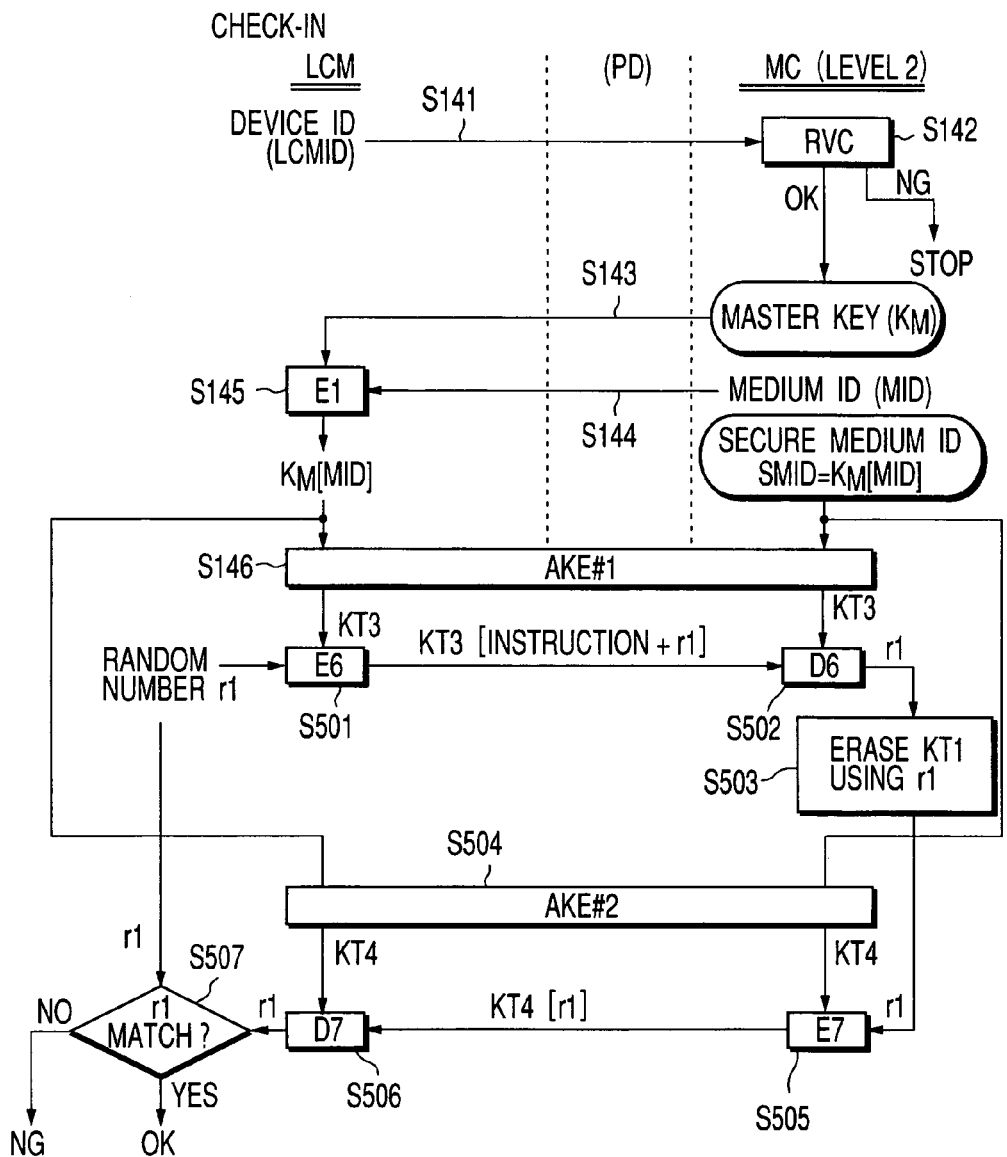
FIG. 12 is a chart for explaining a sequence upon check-in when the type of recording medium is level 2.

The check-in process shown in FIG. 12 executes a bilateral authentication processes (AKE) twice, upon erasing (erasing by rewriting a random number on) key information (or preferably key information and encrypted content) recorded on the MC 13, and upon confirming if the information has been erased.

The SMS 2 reads out the device ID (LCMID) of that LCM 1 from the device ID memory 4, and transfers it to the MC 13 (step S141).

The MC 13 checks if the transferred device ID is registered in the RVC list (step S142). If the transferred device ID is not registered, the MC 13 reads out master key KM by accessing the secure area 13c, and transfers it to the LCM 1 (step S143). Furthermore, the MC 13 reads out its identification information (MID) from the identification information memory 13b and transfers it to the LCM 1 (step S144).

The LCM 1 encrypts the medium ID (MID) transferred from the MC 13 using master key KM to generate information (KM[MID]) required for a bilateral authentication process (AKE) (step S145).

The LCM 1 executes a first bilateral authentication process (AKE#1) using the generated information KM[MID], while the MC 13 executes a first bilateral authentication process (AKE#1) using a secure medium ID (SMID) (step S146).

Figure 22:
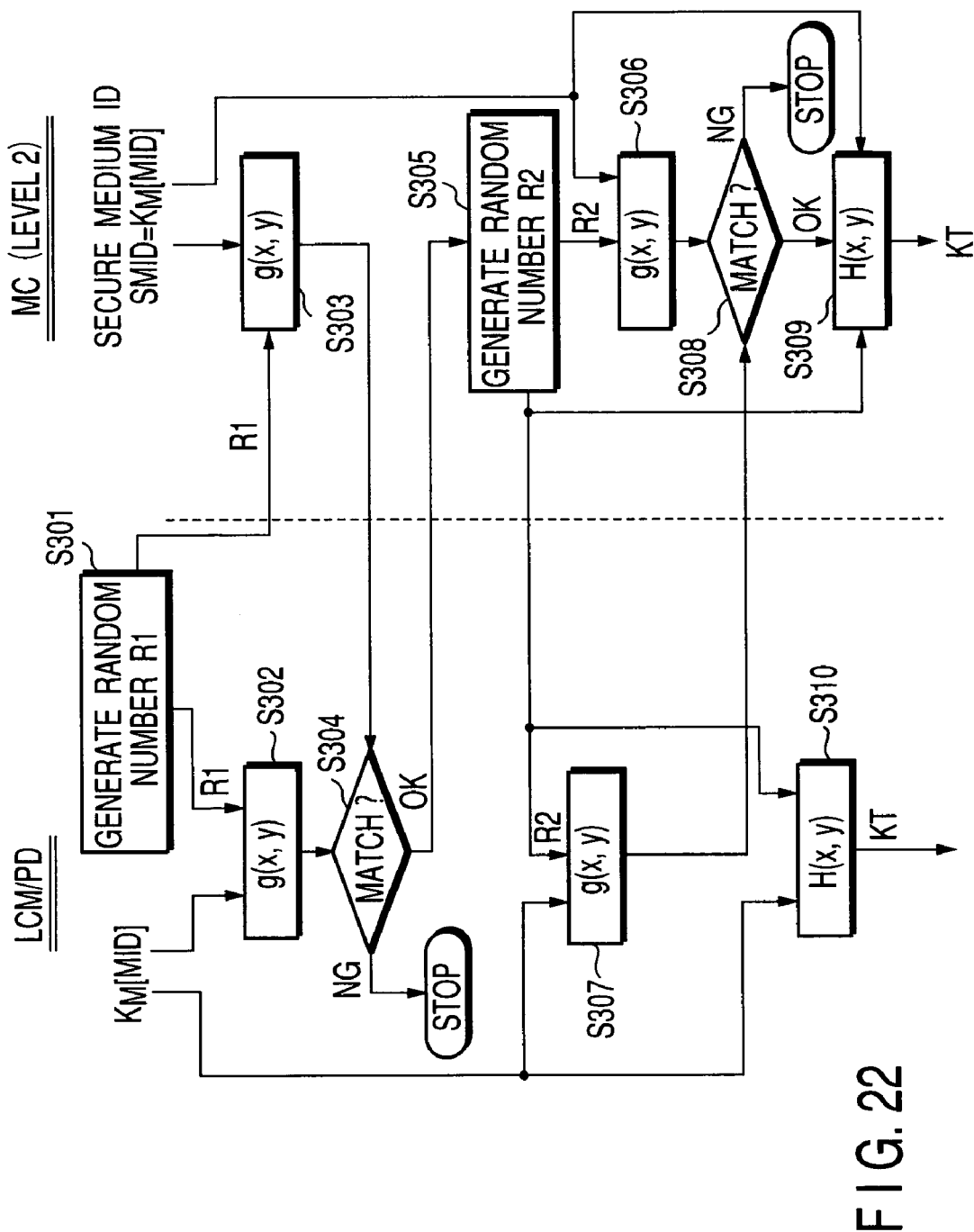
FIG. 22 is a chart for explaining processing operation of a bilateral authentication process (AKE)

Since the bilateral authentication process (AKE#1) in step S146 is the same as that shown in FIG. 22, a detailed description thereof will be omitted.

If the LCM 1 and MC 13 confirm in step S146 that they are authentic the LCM 1 generates random number r1 to be rewritten on key information KT1 stored in the secure area (RAM area) 13c of the MC 13 using a conventional random number generator, encrypts the generated random number and instruction for rewriting to the MC 13 using key information KT (KT3 in this case) generated in step S146 (KT3[instruction+r1]), and transfers the encrypted information to the MC 13 (step S501). Note that the instruction may contain the address that key information KT1 is written.

The MC 13 decrypts KT3[instruction+r1] transferred from the LCM 1 using key information KT3 generated in step S146 to obtain random number r1 (step S502). The MC 13 erases key information KT1 stored in the secure area (RAM area) 13c of the MC 13 by rewriting the key information by using this random number r1 (step S503). Note that, not only key information KT1 but also encrypted content decryption key Kc (KT1[Kc]) and encrypted content Kc[C] may be erased by rewriting them by using random number r1 formation KT1.

Then, a process for confirming if key information KT1 (or preferably key information KT1 and encrypted content information, and the like) has been surely erased by random number r1 is executed. More specifically, the LCM 1 executes a second bilateral authentication process (AKE#2) using information KM[MID] generated in step S145, while the MC 13 executes a second bilateral authentication process (AKE#2) using a secure medium ID (SMID) (step S504).

Since the second bilateral authentication process (AKE#2) in step S504 is the same as that shown in FIG. 22, a detailed description thereof will be omitted.

If the LCM 1 and MC 13 confirm in step S504 that they are authentic, the MC 13 reads data (random number r1 if rewrite has been normally done) from the address that key information KT1 is stored, and encrypts the read data using key information KT (KT4 in this case) generated in step S504 (KT4[r1]), and transfers it to the LCM 1 (step S505).

The LCM 1 decrypts KT4[r1] transferred from the MC 13 using key information KT4 generated in step S504 (step S506), and compares the decrypted data with random number r1 generated in step S501. If the two data match, the LCM 1 determines that key information KT1 (or content) has been erased by random number r1, and ends the process (step S507). If the two data do not match, the LCM 1 preferably informs this abnormality or the like.

Figure 7C:
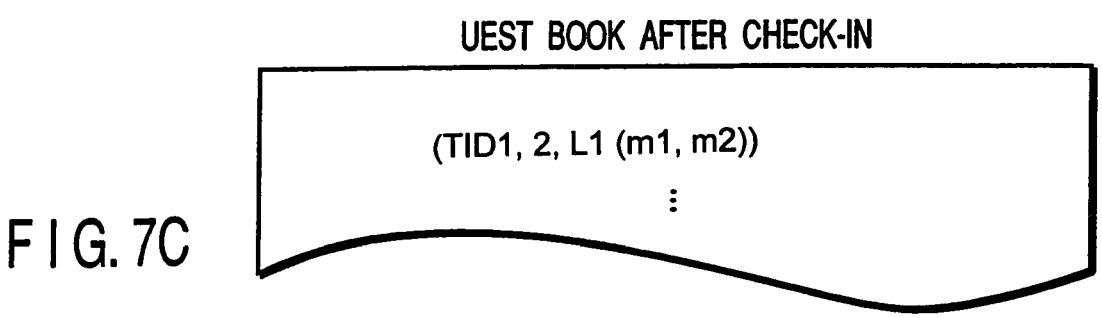

Finally, as shown in FIG. 7C, "1" is added to the remaining number n of the check-in requested content having content ID="TID1" in the guest book, and identification information of MC3 "m0" is deleted from check-out list L1.

Figure 13:
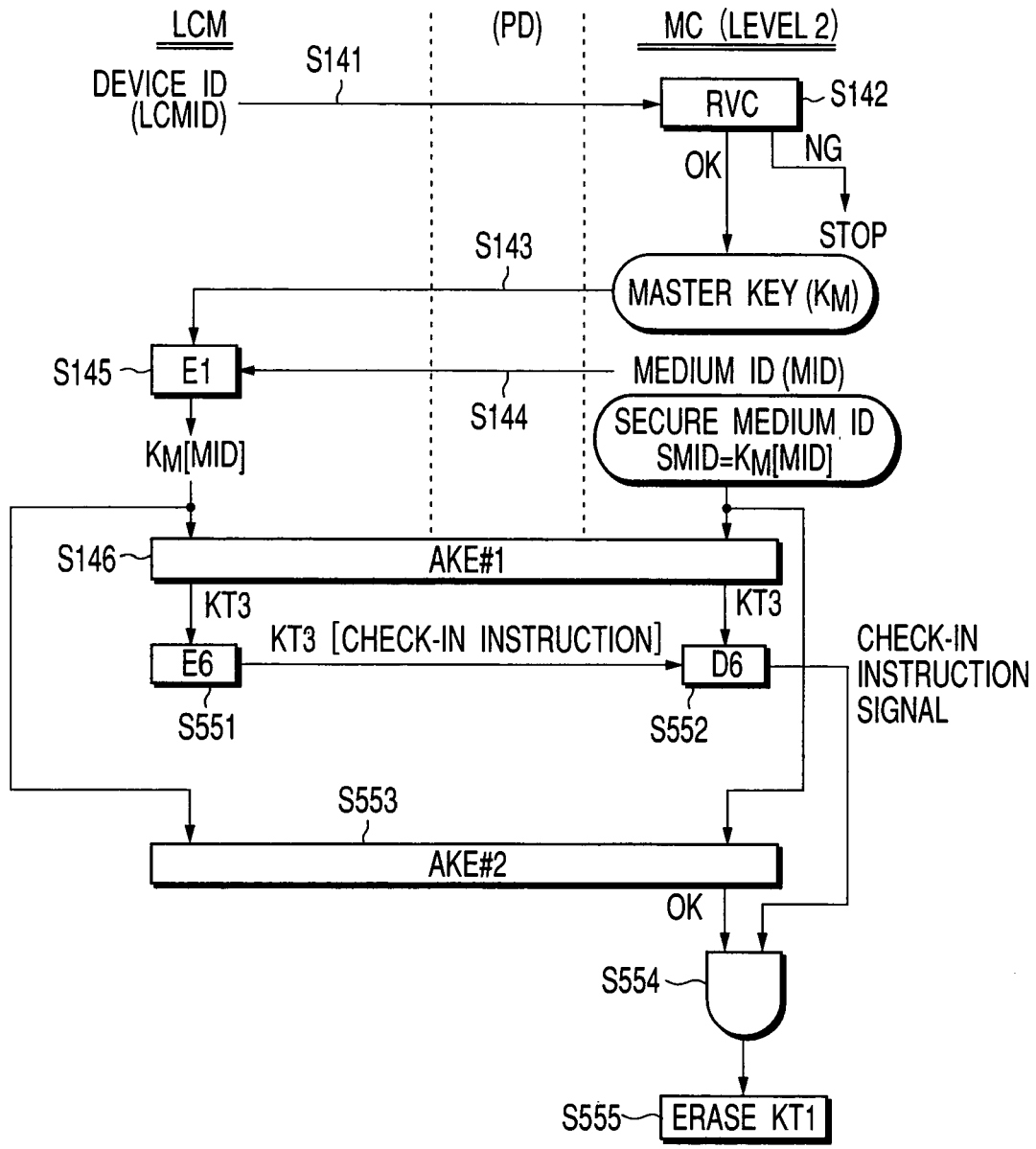
FIG. 13 is a chart for explaining another sequence upon check-out when the type of recording medium is level 2.

Another check-in process, which is different from that shown in FIG. 12, will be explained below with reference to FIG. 13. Note that the same reference numerals denote the same portions as those in FIG. 12, and only different portions will be explained below. That is, the check-in process shown in FIG. 13 is characterized in that a bilateral authentication process (AKE) is done twice, i.e., upon transferring instruction (e.g., instruction that indicates the start of check-in) or command for erasing key information recorded on the MC 13, and as a trigger for executing the process for erasing key information etc. The process until AKE#1 in step S146 is the same as that in FIG. 12.

If the LCM 1 and MC 13 confirm in step S146 that they are authentic, the LCM 1 encrypts instruction indicating the start of check-in using key information KT (KT3 in this case) generated in step S146, then transfers encrypted instruction (KT3[check-in instruction]) to the MC 13 (step S551). Note that the check-in instruction may contain the address that key information KT1 is written.

The MC 13 decrypts KT3[check-in instruction] transferred from the LCM 1 using key information KT3 generated in step S146 to obtain the check-in instruction (step S552).

Then, a second bilateral authentication process (AKE#2) is executed as a trigger for generating an actual erase command (step S553). In AKE#2 in this case, after it is checked as in step S308 in FIG. 22 if the values of function g match, only the checking result is output, as shown in FIG. 23.

If the values of function g match, and the check-in instruction has been obtained previously, the MC 13 erases key information KT1 (or preferably key information KT1 and encrypted content) (steps S554 and S555). For example, key information KT1 or the like may be erased by rewriting the file management area of the MC 13.

Finally, as shown in FIG. 7C, "1" is added to the remaining number n of the check-in requested content having content ID="TID1" in the guest book, and identification information of MC3 "m0" is deleted from check-out list L1.

Another check-out process, which is different from that shown in FIG. 10, will be described below with reference to FIG. 14. Note that the same reference numerals denote the same portions as those in FIG. 10, and only different portions will be explained below. That is, FIG. 14 is characterized by a process for content decryption key Kc to be transferred to the MC 13.

Referring to FIG. 14, the LCM 1 encrypts content decryption key Kc using KM[MID] (to be expressed by w hereinafter) generated in step S105 (step S162). The LCM 1 further encrypts content decryption key Kc encrypted by w (w[Kc]) using key information KT1 generated in the bilateral authentication process (AKE) in step S106 (KT1[w[Kc]]), and then transfers it to the MC 13 (step S163).

The MC 13 decrypts the transferred KT1[w[Kc]] using key information KT1 generated in the bilateral authentication process (AKE) in step S106 to obtain w[Kc], and stores it in the secure area 13c (step S164).

Content information C is encrypted using Kc (step S165), and is then transferred to the MC 13 (step S166) as in FIG. 10.

Figure 15:
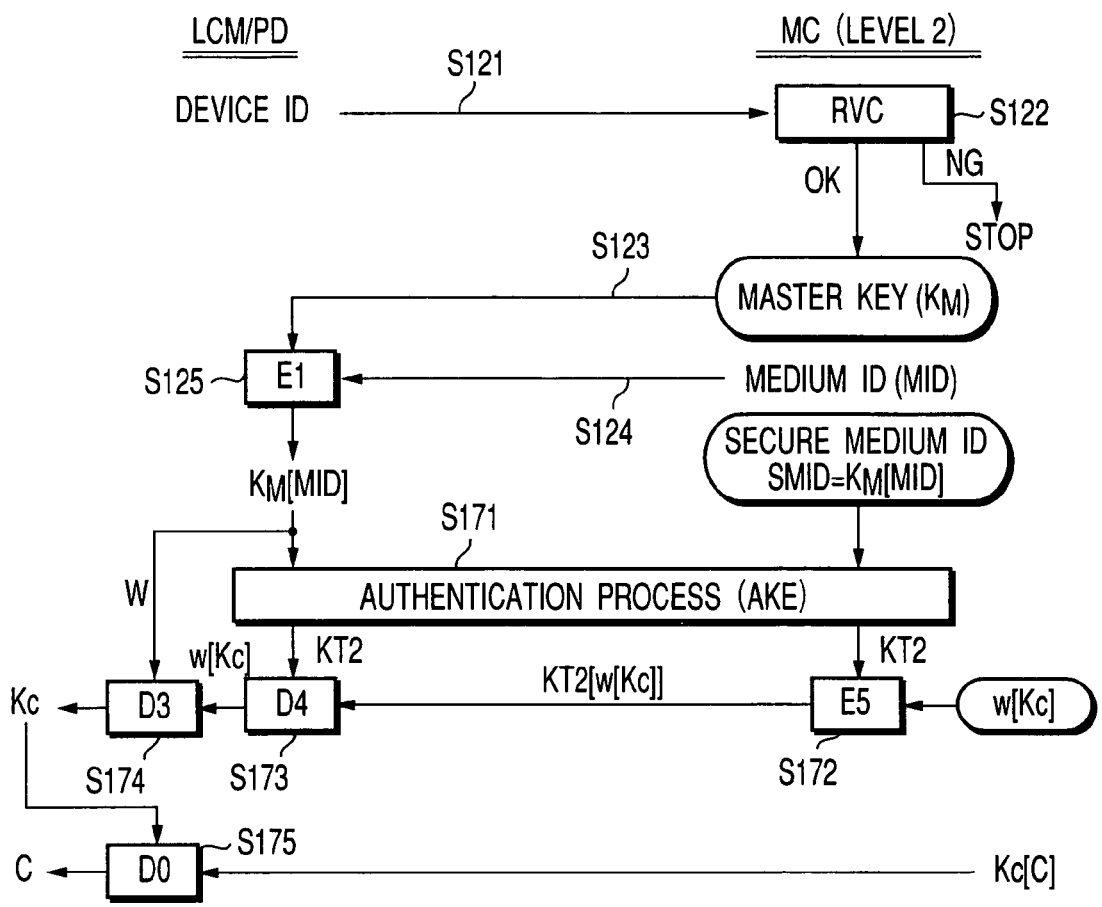
FIG. 15 is a chart for explaining another sequence upon playback when the type of recording medium is level 2.

The playback process corresponding to the check-out process shown in FIG. 14 will be explained below with reference to FIG. 15. Note that the same reference numerals denote the same portions as those in FIG. 11, and only different portions will be explained below. More specifically, in FIG. 15 the MC 13 encrypts encrypted content decryption key w[Kc] stored in the secure area 13c using key information KT2 generated in the bilateral authentication process (AKE) in step S126 (KT2[w[Kc]]), and then transfers it to the LCM 1 or PD 12 (step S172). The LCM 1 or PD 12 decrypts KT2[w[Kc]] transferred from the MC 13 using key information KT2 generated in step S126 (step S173), and decrypts the obtained w[Kc] using w=KM[KID] generated in step S123 to obtain content decryption key Kc (step S174). The LCM 1 or PD 12 decrypts encrypted content Kc[C] using this content decryption key Kc to obtain content C (step S175).

In the LCM 1 or PD 12, the decoder 12h decodes content C, and the D/A converter 12i converts the decoded content from a digital signal into an analog signal, thus playing back the copied content (e.g., music) recorded on the MC 13.

The check-in process corresponding to the check-out process shown in FIG. 14 is substantially the same as that described with reference to FIGS. 12 or 13, except that content decryption key encrypted by w=KM[MID] (w[Kc]) are deleted from the secure area 13c of the MC 13 in step S503 in FIG. 12 or step S555 in FIG. 13 in place of key information KT1.

(3) Check-In/Check-Out/Playback Process of Copied Content Using MC of Level 0

The check-in/check-out and playback processes using the MC 13 of level 0 with the format shown in FIG. 4A will be explained below.

In this case, the MC 13 is set in the PD 12, and executes a check-out process with the LCM 1 via the PD 12. The basic operation is the same as that of the MC 13 of level 2. However, in case of level 0, since the MC 13 has neither a secure area nor a medium ID, the PD 12 in place of the MC 13 of level 0 executes a process shown in FIG. 10 with respect to the LCM 1. For this purpose, the secure area of the PD 12 pre-stores master key KM, secure device key SPDID, and a revocation list (RVC list). Note that master key KM has the same function as that of master key KM stored in the MC 13, but data itself need not always be the same.

In step S3 in FIG. 9, the type of MC 13 is determined to be level 0.

A case will be explained below with reference to FIG. 16 wherein a check-out instruction is issued to the SMS 2 via a user interface (I/F) 15 or via the PD 12.

The SMS 2 checks the remaining number n of children of check-out requested content (e.g., having a content ID="TID1") in the guest book. If n>0, the SMS 2 reads out the device ID (LCMID) of the corresponding LCM 1 from the device ID memory 4, and transfers it to the PD 12 (step S201).

The PD 12 checks if the transferred device ID is registered in the RVC list (step S202). If the transferred device ID is not registered, the PD 12 reads out master key KM by accessing its secure area, and transfers it to the LCM 1 (step S203). Furthermore, the PD 12 reads out its identification information, i.e., the device ID (PDID) from, e.g., the ROM 12c, and transfers it to the LCM 1 (step S204).

The LCM 1 encrypts the device ID (PDID) transferred from the PD 12 using master key KM to generate information (KM[PDID]) required for a bilateral authentication process (AKE) (step S205).

The LCM 1 executes the bilateral authentication process (AKE) using the generated information KM[PDID], while the PD 12 executes the bilateral authentication process (AKE) using a secure device ID (SPDID) (step S206). Since the bilateral authentication process in step S206 is the same as that shown in FIG. 22, a description thereof will be omitted.

If the LCM 1 and MC 13 confirm that they are authentic, the PD 12 stores the generated key information KT (in this case, KT1) in the secure area (step S207). The LCM 1 encrypts a decryption key (content decryption key) Kc used to decrypt the encrypted content using the key information KT1 generated in step S206, and transfers encrypted content decryption key Kc (KT1[Kc]) to the MC 13 via the PD 12 (steps S208 and S209). Also, the LCM 1 encrypts content information C using Kc (Kc[C]), and transfers the encrypted content to the MC 13 via the PD 12 (steps S210 and S211).

Finally, the SMS 2 subtracts "1" from the remaining number n of children of the check-out requested content having content ID="TID1" in the guest book, and adds identification information of PD12 (PDID) in check-out list L1, as shown in FIG. 7B.

The MC 13 stores transferred encrypted content decryption key KT1[Kc] and encrypted content Kc[C] in the public area 13a.

Figure 17:
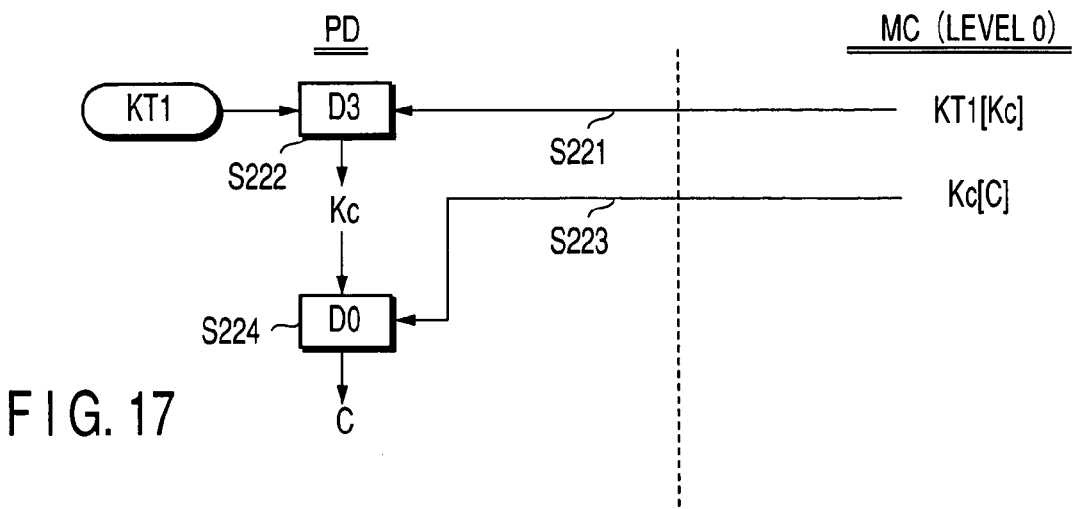
FIG. 17 is a chart for explaining a sequence upon playback when the type of recording medium is level 0.

The process between the PD 12 and MC 13 when the PD 12 receives a playback instruction will be explained below with reference to FIG. 17.

The MC 13 transfers encrypted content decryption key KT1[Kc] recorded on its public area to the PD 12 (step S221). If the PD 12 is the one which was used to check out to the MC 13, it must store key information KT1 for decrypting the encrypted content decryption key in its secure area (see step S207 in FIG. 16). Therefore, such authentic PD 12 can obtain content decryption key Kc by decrypting KT1[Kc] transferred from the MC 13 using key information KT1 read out from its secure area (step S222). Furthermore, the PD can obtain content C by decrypting encrypted content Kc[C] transferred from the MC 13 using that content decryption key Kc (steps S223 and S224). In the PD 12, the decoder 12h decodes content C, and the D/A converter 12i converts the decoded content from a digital signal into an analog signal, thus playing back the copied content (e.g., music) recorded on the MC 13.

A case will be explained below with reference to FIG. 18 wherein a check-in instruction is issued to the SMS 2 via the PD 12 (i.e., using the MC 13 set in the PD 12 connected to the LCM 1). In this case as well, the PD 12 in place of the MC 13 of level 0 executes a process shown in FIG. 12 with respect to the LCM 1 in the check-out process.

The SMS 2 reads out the device ID (LCMID) of that LCM 1 from the device ID memory 4, and transfers it to the PD 12 (step S231).

The PD 12 checks if the transferred device ID is registered in the RVC list (step S232). If the transferred device ID is not registered, the PD 12 reads out master key KM by accessing its secure area, and transfers it to the LCM 1 (step S233). Furthermore, the PD 12 reads out its identification information (PDID) and transfers it to the LCM 1 (step S234).

The LCM 1 encrypts the device ID (PDID) transferred from the PD 12 using master key KM to generate information (KM[PDID]) required for a bilateral authentication process (AKE) (step S235).

The LCM 1 executes a first bilateral authentication process (AKE#1) using the generated information KM[PDID], while the PD 12 executes a first bilateral authentication process (AKE#1) using a secure device ID (SPDID) (step S236).

Since the first bilateral authentication process (AKE#1) in step S236 upon check-in is substantially the same as that shown in FIG. 22 except that KM[PDID] replaces KM[MID], and the secure device ID (SPDID) replaces the secure medium ID (SMID), a description thereof will be omitted.

If the LCM 1 and PD 12 confirm in step S236 that they are authentic, the LCM 1 generates random number r1 to be used for rewriting key information KT1 stored in the secure area (RAM area) of the PD 12, using a conventional random number generator, encrypts the generated random number r1 and instruction to the MC 13 using key information KT (KT3 in this case) generated in step S236, and transfers the encrypted information (KT3[instruction+r1]) to the PD 12 (step S601). Note that the instruction may contain the address that key information KT1 is written.

The PD 12 decrypts KT3[instruction+r1] transferred from the LCM 1 using key information KT3 generated in step S236 to obtain random number r1 (step S602). Key information KT1 stored in the secure area (RAM area) of the PD 12 is rewrote(overwrote) by this random number r1 and erased (step S603).

Then, a process for confirming if key information KT1 has been surely erased by random number r1 is executed. More specifically, the LCM 1 executes a second bilateral authentication process (AKE#2) using information KM[PDID] generated in step S235, while the PD 12 executes a second bilateral authentication process (AKE#2) using a secure medium ID (SPDID) (step S604).

Since the second bilateral authentication process (AKE#2) in step S604 is the same as AKE#1 in step S236, a detailed description thereof will be omitted.

If the LCM 1 and MC 13 confirm in step S604 that they are authentic, the PD12 reads data (random number r1 if rewrite has been normally done) from the storage address of key information KT1, encrypts the read data using key information KT (KT4 in this case) generated in step S604, and transfers encrypted data (KT4[r1]) to the LCM 1 (step S605).

The LCM 1 decrypts KT4[r1] transferred from the PD 12 using key information KT4 generated in step S604 (step S606), compares data obtained by decryption with random number r1 generated in step S601. If the two data match, the LCM 1 determines that key information KT1 has been erased by random number r1, and ends the process (step S607). If the two data do not match, the LCM 1 preferably informs this abnormality or the like.

Finally, as shown in FIG. 7C, "1" is added to the remaining number n of the check-in requested content having content ID="TID1" in the guest book, and identification information of that PD 12 is deleted from check-out list L1.

Another check-in process, which is different from that shown in FIG. 18, will be explained below with reference to FIG. 19. Note that the same reference numerals denote the same portions as those in FIG. 18, and only different portions will be explained below. That is, the processing operation upon check-in shown in FIG. 19 is characterized in that a bilateral authentication process (AKE) is done twice, i.e., upon transferring instruction (e.g., instruction that indicates the start of check-in (check-in instruction)) or command for erasing key information recorded on the PD 12, and as a trigger for executing the process for erasing key information etc. The process until AKE#1 in step S236 is the same as that in FIG. 18.

If the LCM 1 and MC 13 confirm in step S236 that they are authentic, the LCM 1 encrypts the check-in instruction using key information KT (KT3 in this case) generated in step S236 (KT3[check-in instruction]), and transfers it to the MC 13 (step S651). Note that the check-in instruction may contain the address that key information KT1 is written.

The PD 12 decrypts KT3[check-in instruction] transferred from the LCM 1 using key information KT3 generated in step S236 to obtain the check-in instruction (step S652).

Then, a second bilateral authentication process (AKE#2) is executed as a trigger for generating an actual erase command (step S653). In AKE#2 in this case, after it is checked as in step S308 in FIG. 22 if the values of function g match, only the checking result is output, as shown in FIG. 23.

If the values of function g match, and the check-in instruction has been obtained previously, the PD 12 erases key information KT1 (or preferably key information KT1 and encrypted content information) (steps S654 and S655). For example, key information KT1 or the like may be erased by rewriting the file management area of the PD 12.

Finally, as shown in FIG. 7C, "1" is added to the remaining number n of the check-in requested content having content ID="TID1" in the guest book, and identification information of that PD 12 is deleted from check-out list L1.

The check-out process, which is different from that shown in FIG. 16, will be described below with reference to FIG. 20. Note that the same reference numerals denote the same portions as those in FIG. 16, and only different portions will be explained below. That is, FIG. 20 is characterized by a process for content decryption key Kc to be transferred to the PD 12, as in FIG. 14.

Figure 20:
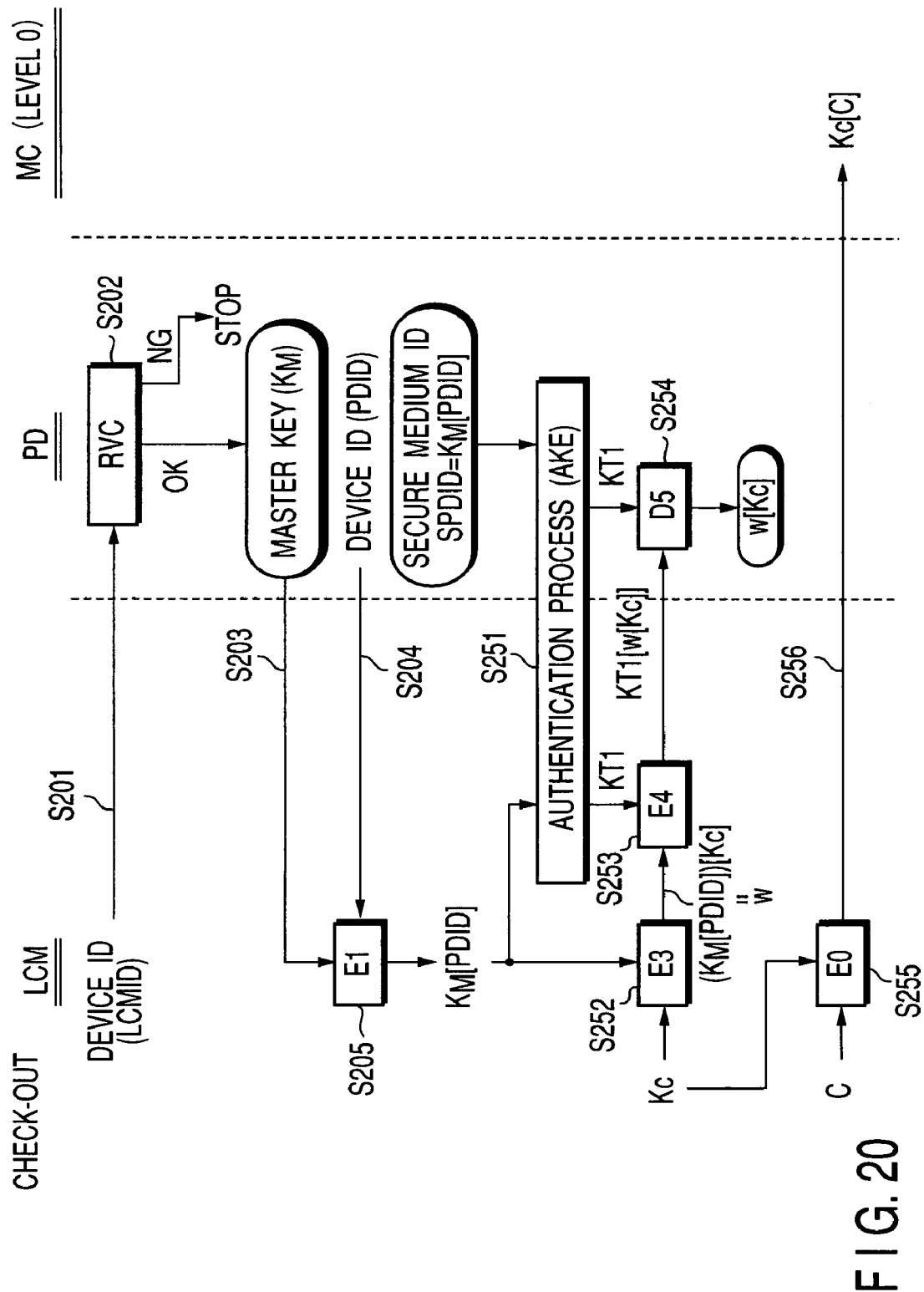
FIG. 20 is a chart for explaining another sequence upon check-out when the type of recording medium is level 0.

Referring to FIG. 20, the LCM 1 encrypts content decryption key Kc using KM[PDID] (to be expressed by w hereinafter) generated in step S205 (step S252). The LCM 1 further encrypts content decryption key Kc encrypted by w (w[Kc]) using key information KT1 generated in the bilateral authentication process (AKE) in step S251, and then transfers encrypted content decryption key (KT1[w[Kc]]) to the PD 12 (step S253).

The PD 12 decrypts the transferred KT1[w[Kc]] using key information KT1 generated in the bilateral authentication process (AKE) in step S251 to obtain w[Kc], and stores it in the secure area (step S254).

Figure 16:
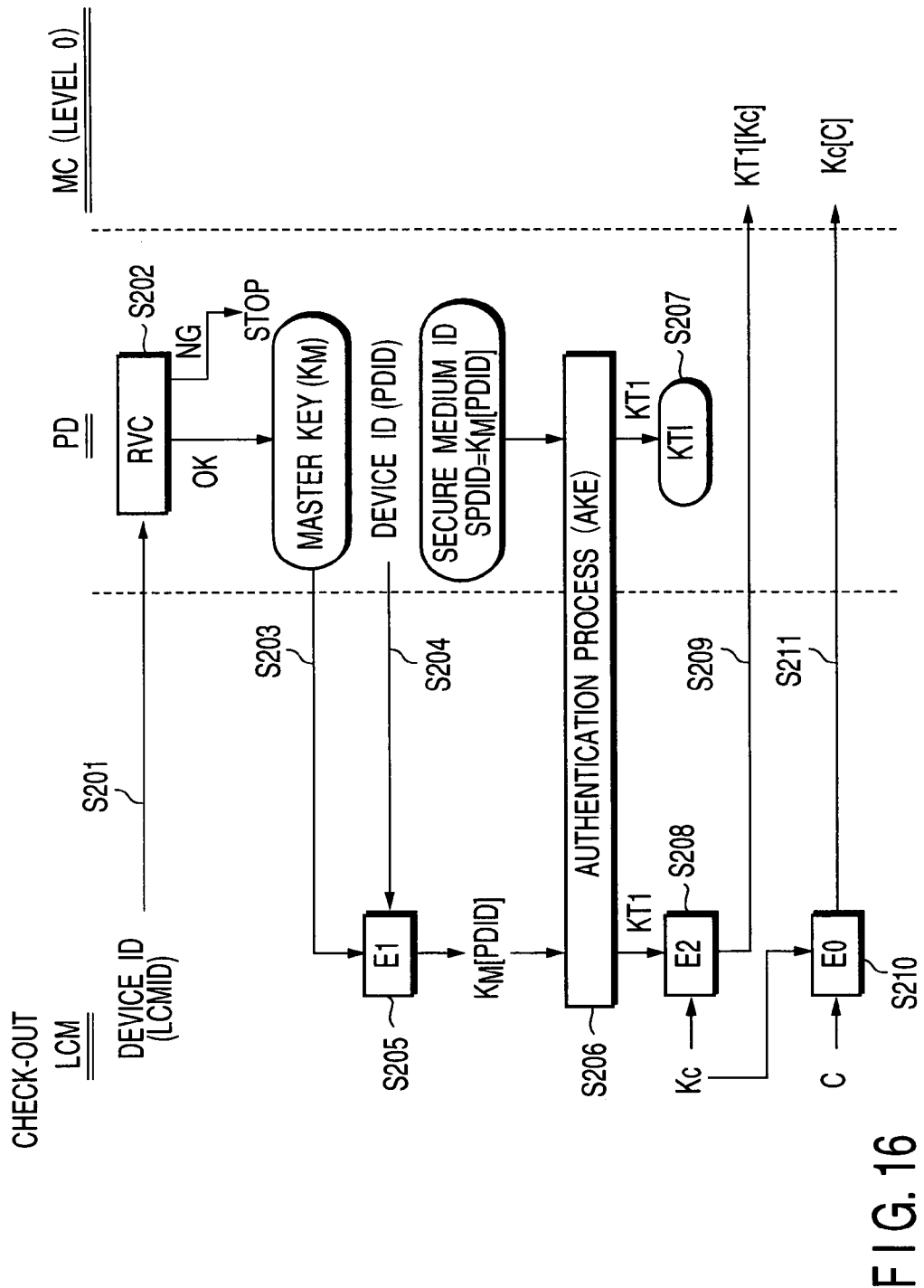
FIG. 16 is a chart for explaining a sequence upon check-out when the type of recording medium is level 0.

Content information C is encrypted using Kc (step S255), and is then transferred to the MC 13 via the PD 12 (step S256), as in FIG. 16.

Figure 21:
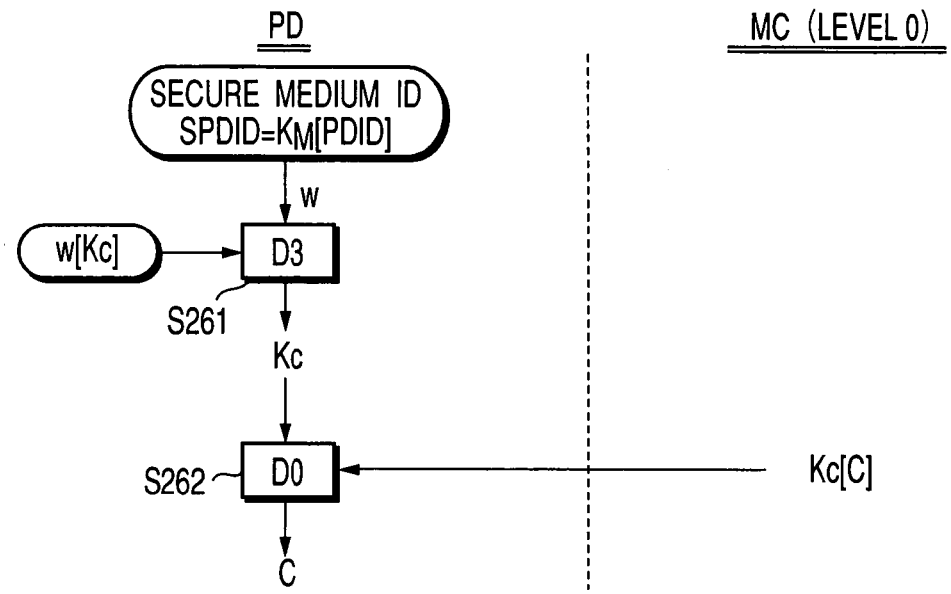
FIG. 21 is a chart for explaining another sequence upon playback when the type of recording medium is level 0.

The playback process corresponding to the check-out process shown in FIG. 20 will be explained below with reference to FIG. 21. Note that the same reference numerals denote the same portions as those in FIG. 20, and only different portions will be explained below. More specifically, in FIG. 21 the PD 12 can obtain content decryption key Kc by decrypting encrypted content decryption key w[Kc] stored in its secure area using its secure device ID (SPDID=w) (step S261). The PD 12 can obtain content C by decrypting encrypted content Kc[C] transferred from the MC 13 using that content decryption key Kc (step S262). In the PD 12, decoder 12h decodes content C, and the D/A converter 12i converts the decoded content from a digital signal into an analog signal, thus playing back the copied content (e.g., music) recorded on the MC 13.

Figure 18:
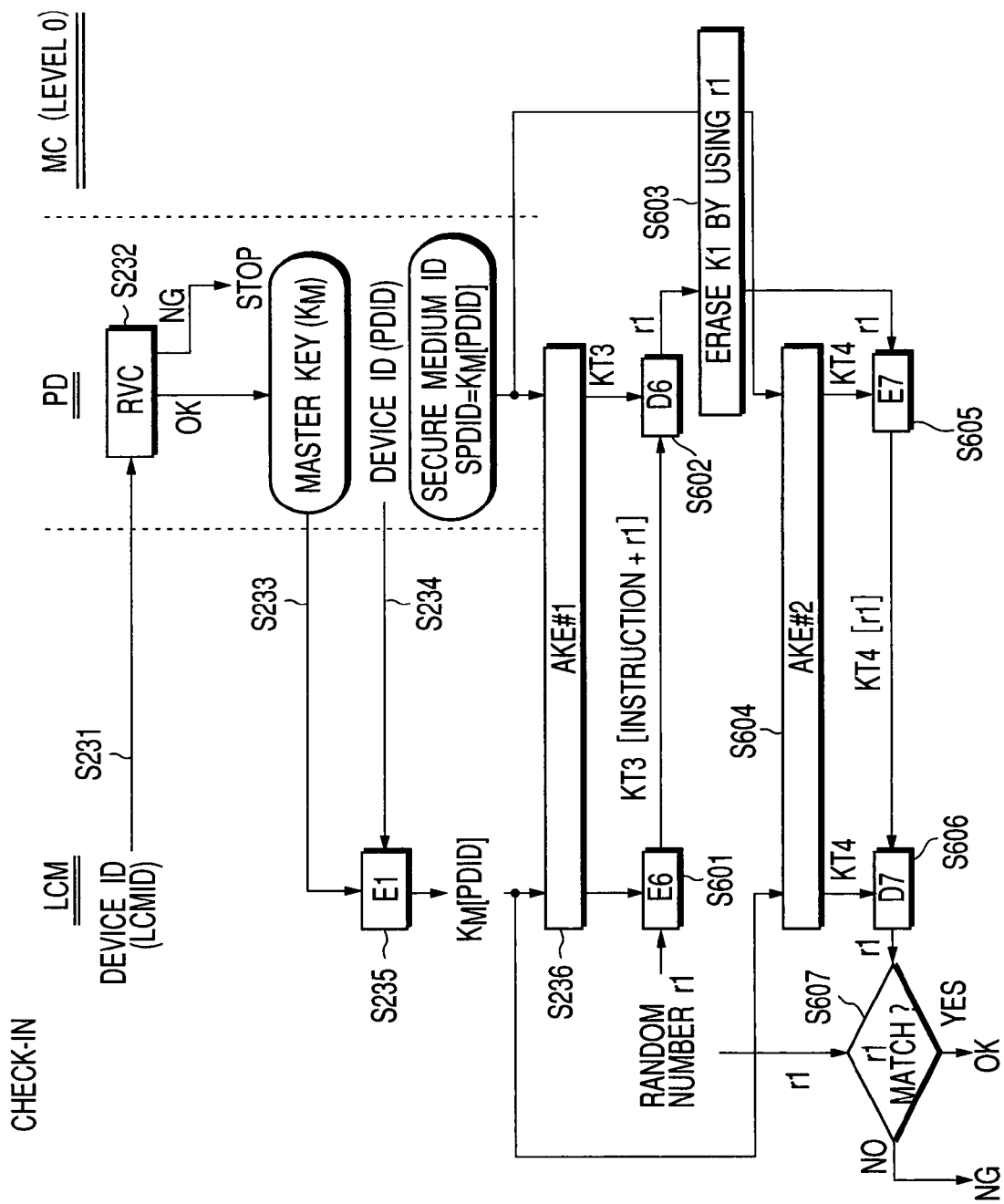
FIG. 18 is a chart for explaining a sequence upon check-in when the type of recording medium is level 0.
Figure 19:
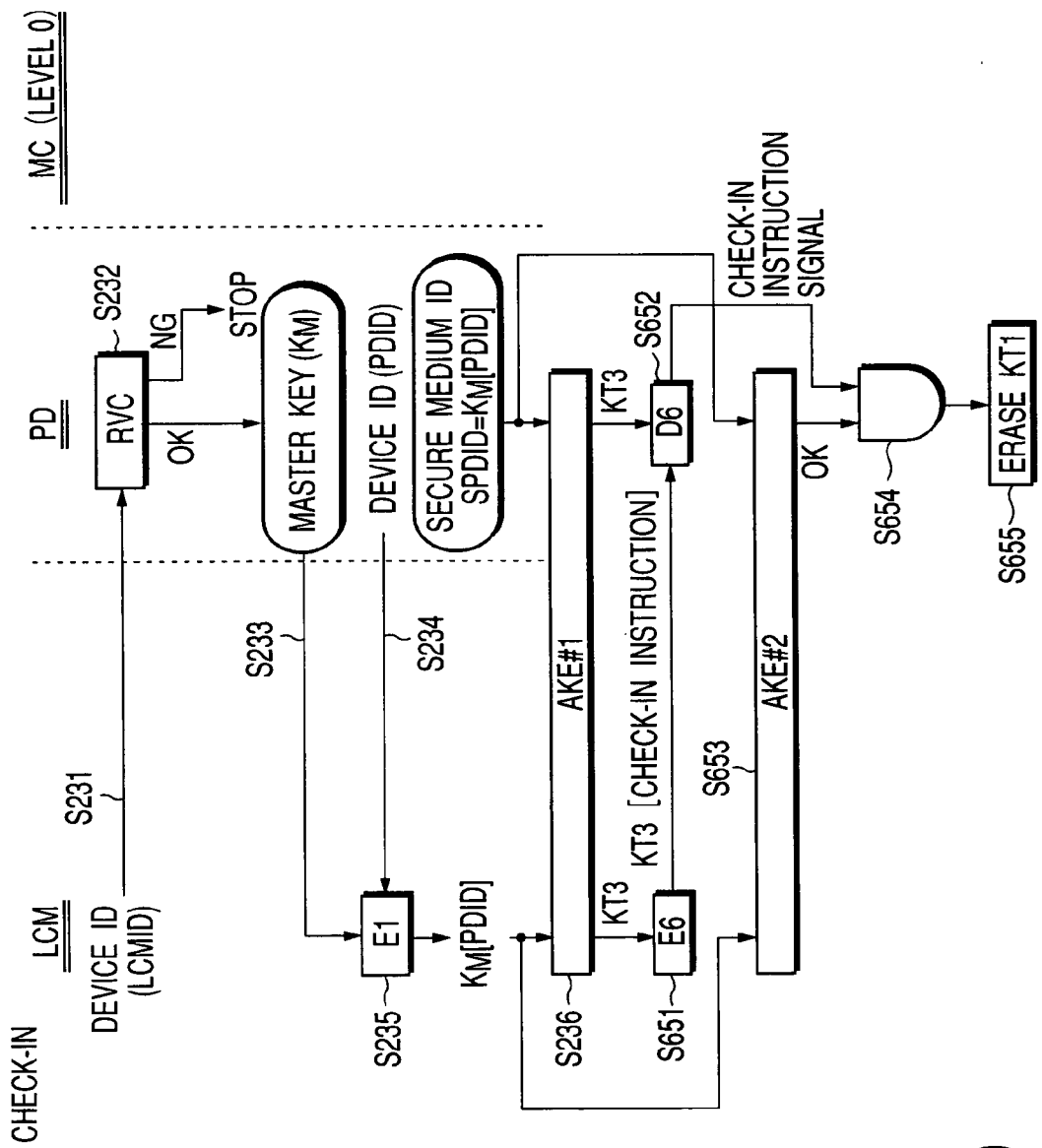
FIG. 19 is a chart for explaining another sequence upon check-in when the type of recording medium is level 0.

The check-in process corresponding to the check-out process shown in FIG. 20 is substantially the same as that of FIG. 18 or 19, except that content decryption key encrypted by w=KM[PDID] (w[Kc]) in place of key information KT1 is deleted from the secure area of the PD 12 in step S603 in FIG. 18 or step S655 in FIG. 19.

Additional advantages and modifications will readily occur to those skilled in the art. Therefore, the invention in its broader aspects is not limited to the specific details and representative embodiments shown and described herein. Accordingly, various modification may be made without departing from the spirit or scope of the general inventive concept as defined by the appended claims and their equivalents.

What is claimed is:

1. A content management method for a content management apparatus for managing an allowable number of recording media, each of the recording media including a first memory area storing at least an encrypted content and a second memory area storing key information item necessary for decrypting the encrypted content, an initial value of the allowable number being a predetermined upper limit, the method including a check out method and a check in method, the check out method comprising:

performing first bilateral authentication between the content management apparatus and a recording medium, when the allowable number is more than zero, to obtain a first shared information item that is generated as a result of success in the first bilateral authentication and that is identical to that of the recording medium configured to store the first shared information item generated in the recording medium in the second memory area as the key information item;

encrypting a decryption key for decrypting the encrypted content, using the first shared information item, to obtain an encrypted key;

transferring the encrypted content and the encrypted key to the recording medium configured to store the encrypted content and the encrypted key in the first memory area; and decreasing the allowable number by one when the encrypted content and the encrypted key are transferred to the recording medium, wherein the check in method comprises:

performing second bilateral authentication between the content management apparatus and the recording medium whose first memory area stores the encrypted content and the encrypted key and whose second memory area stores the key information item, to obtain a second shared information item that is identical to that of the recording medium and that is generated as a result of success in the second bilateral authentication;

generating a random data item when the second bilateral authentication ends in success;

encrypting the random data item using the second shared information item;

transferring the encrypted random data item to the recording medium configured to overwrite into the second memory area with the random data item and erase the key information item from the second memory area;

performing third bilateral authentication between the content management apparatus and the second recording medium to obtain a third shared information item that is identical to that of the recording medium and that is generated as a result of success in the third bilateral authentication;

receiving an encrypted data item that is transferred from the recording medium configured to generate the encrypted data item by encrypting a data item stored in the second memory area using the third shared information item;

decrypting the encrypted data item using the third shared information item;

determining that the key information item in the second memory area is erased when the decrypted data item is identical to the random data item; and increasing the allowable number by one when the key information item in the second memory area is determined to be erased.

2. A content management apparatus for managing an allowable number of recording media, each of the recording media including a first memory area storing at least an encrypted content and a second memory area storing a key information item necessary for decrypting the encrypted content, an initial value of the allowable number being a predetermined upper limit, the content management apparatus comprising:

means for executing a check out process and means for executing a check in process, wherein the means for executing a check out process comprises:

means for performing first bilateral authentication between the content management apparatus and a recording medium, when the allowable number is more than zero, to obtain a first shared information item that is generated as a result of success in the first bilateral authentication and that is identical to that of the recording medium configured to store the first shared information item generated in the recording medium in the second memory area as the key information item;

means for encrypting a decryption key for decrypting the encrypted content, using the first shared information item, to obtain an encrypted key;

means for transferring the encrypted content and the encrypted key to the recording medium configured to store the encrypted content and the encrypted key in the first memory area; and means for decreasing the allowable number by one when the encrypted content and the encrypted key are transferred to the recording medium, wherein the means for executing a check out process comprises:

means for performing second bilateral authentication between the content management apparatus and the recording medium whose first memory area stores the encrypted content and the encrypted key and whose second memory area stores the key information item, to obtain a second shared information item that is identical to that of the recording medium and that is generated as a result of success in the second bilateral authentication;

means for generating a random data item when the second bilateral authentication ends in success;

means for encrypting the random data item using the second shared information item;

means for transferring the encrypted random data item to the recording medium configured to overwrite into the second memory area with the random data item and erase the key information item from the second memory area;

means for performing third bilateral authentication between the content management apparatus and the second recording medium to obtain a third shared information item that is identical to that of the recording medium and that is generated as a result of success in the third bilateral authentication;

means for receiving an encrypted data item that is transferred from the recording medium configured to generate the encrypted data item by encrypting a data item stored in the second memory area using the third shared information item;

means for decrypting the encrypted data item using the third shared information item;

means for determining that the key information item in the second memory area is erased when the decrypted data item is identical to the random data item; and means for increasing the allowable number by one when the key information item in the second memory area is determined to be erased.

3. A recording medium including an arithmetic processing function, a first memory area and a second memory area, the recording medium executing a check out process and a check in process with a content management apparatus that manages an allowable number of recording media, each of the recording media including the arithmetic processing function, the first memory area storing at least an encrypted content and the second memory area storing a key information item necessary for decrypting the encrypted content an initial value of the allowable number being a predetermined upper limit, the allowable number being decreased by one when at least the encrypted content and the key information item are stored in the recording medium in the check out process and being increased by one when the key information item in the second memory area of the recording medium is determined to be erased in the check in process the recording medium comprising:

means for executing the check out process and means for executing the check in process, wherein the means for executing the check out process comprises:

means for performing first bilateral authentication between the recording medium and the content management apparatus, when the allowable number is more than zero, to obtain a first shared information item that is identical to that of the content management apparatus and that is generated as a result of success in the first bilateral authentication;

means for storing the first shared information item in the second memory area as the keV information item;

means for receiving the encrypted content and a decryption key encrypted using the first shared information item generated in the content management apparatus;

means for storing the encrypted content and the the decryption key encrypted in the first memory area, wherein the means for executing the check in process comprises:

means for performing second bilateral authentication between the content management apparatus and the recording medium whose first memory area stores the encrypted content and the decryption key encrypted and whose second memory area stores the key information item to obtain a second shared information item that is identical to that of the content management apparatus and that is generated as a result of success in the second bilateral authentication; means for receiving a random data item that is encrypted using the second shared information item generated in the content management apparatus when the second bilateral authentication ends in success;

means for erasing the key information item in the second memory area by overwriting into the second memory area with the random data item;

means for performing third bilateral authentication between the recording medium and the content management apparatus to obtain a third shared information item that is identical to that of the content management apparatus and that is generated as a result of success in the third bilateral authentication;

means for encrypting a data item stored in the second memory area, using the third shared information item, to obtain an encrypted data item; and means for transferring the encrypted data item to the content management apparatus, configured to determine that the key information item in the second memory area is erased when the data item obtained by decrypting using the third shared information item generated in the content management apparatus is identical to the random data item.

* * * * *

UNITED STATES PATENT AND TRADEMARK OFFICE
CERTIFICATE OF CORRECTION

PATENT NO. : 7,181,008 B1
APPLICATION NO. : 09/611716
DATED : February 20, 2007
INVENTOR(S) : Kamibayashi et al.

It is certified that error appears in the above-identified patent and that said Letters Patent is hereby corrected as shown below:

Claim 1, column 17, line 16, change "storing key" to --storing a key--.

Claim 3, column 19, line 40, change "the keV" to --the key--.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO.         : 7,181,008 B1                                        Page 1 of 1
APPLICATION NO. : 09/611716
DATED              : February 20, 2007
INVENTOR(S)        : Kamibayashi et al.

It is certified that error appears in the above-identified patent and that said Letters Patent is hereby corrected as shown below:

Claim 3, column 19, line 20, change "content" to --content,--.

Claim 3, column 20, line 1, change "the the" to --the--.

\* Claim 3, column 20, line 13, change "the second bilateral authentication; means for receiving" to:

--the second bilateral authentication;

means for receiving;--

Signed and Sealed this

Seventh Day of August, 2007

JON W. DUDAS
*Director of the United States Patent and Trademark Office*